(12) United States Patent
Fleishman et al.

(10) Patent No.: US 7,844,546 B2
(45) Date of Patent: Nov. 30, 2010

(54) ONLINE PAYMENT TRANSFER AND IDENTITY MANAGEMENT SYSTEM AND METHOD

(75) Inventors: Jack Fleishman, Vaughan (CA); Zack Fuerstenberg, Toronto (CA)

(73) Assignee: Acxsys Corporation, Toronto (CA)

( * ) Notice: Subject to any disclaimer, the term of this patent is extended or adjusted under 35 U.S.C. 154(b) by 1207 days.

(21) Appl. No.: 10/470,094

(22) PCT Filed: Jan. 25, 2002

(86) PCT No.: PCT/CA02/00107

§ 371 (c)(1),
(2), (4) Date: Mar. 24, 2004

(87) PCT Pub. No.: WO02/059847

PCT Pub. Date: Aug. 1, 2002

(65) Prior Publication Data

US 2004/0148252 A1    Jul. 29, 2004

(30) Foreign Application Priority Data

Jan. 26, 2001   (CA) ................................. 2332656

(51) Int. Cl.
*G06Q 40/00* (2006.01)
(52) U.S. Cl. .......................................... 705/39; 705/44
(58) Field of Classification Search .................. 705/39, 705/40, 44
See application file for complete search history.

(56) References Cited

U.S. PATENT DOCUMENTS

| | | |
|---|---|---|
| 4,823,264 A | 4/1989 | Deming |
| 4,960,981 A | 10/1990 | Benton et al. |
| 5,326,960 A | 7/1994 | Tannenbaum |

(Continued)

FOREIGN PATENT DOCUMENTS

CA    2217593 A1    10/1996

(Continued)

OTHER PUBLICATIONS

Karsten Schulz. (Aug. 1999). The future of digital cash. Banking Policy Report, 18(15/16), 8. Retrieved Jul. 16, 2010, from Banking Information Source.*

(Continued)

*Primary Examiner*—Narayanswamy Subramanian
*Assistant Examiner*—Kito R Robinson
(74) *Attorney, Agent, or Firm*—Jenna L. Wilson; Dimock Stratton LLP (firm)

(57) ABSTRACT

A payment transfer method for transferring funds from a payer to payee is provided, including designating a payee and specifying a payment amount and an account; debiting the funds from the account and crediting a first trust account; and identifying the payee by verifying responses received in response to one or more challenge-response questions defined by the payer. If the one or more responses are verified, a second trust account may be debited and a payee account credited with the payment amount. The first and second trust accounts may then be reconciled. There is also provided a payment transfer facility for transferring funds., comprising an application server for storing payment data relating to a transfer of funds and a notification server for providing a notification of the transfer of funds.

20 Claims, 23 Drawing Sheets

U.S. PATENT DOCUMENTS

| | | | |
|---|---|---|---|
| 5,350,906 A | 9/1994 | Brody et al. | |
| 5,557,518 A | 9/1996 | Rosen | |
| 5,590,196 A * | 12/1996 | Moreau | 705/78 |
| 5,659,165 A | 8/1997 | Jennings et al. | |
| 5,677,955 A | 10/1997 | Doggett et al. | |
| 5,699,528 A * | 12/1997 | Hogan | 705/40 |
| 5,757,917 A | 5/1998 | Rose et al. | |
| 5,825,003 A | 10/1998 | Jennings et al. | |
| 5,884,290 A | 3/1999 | Smorodinsky et al. | |
| 5,897,621 A | 4/1999 | Boesch et al. | |
| 5,937,396 A | 8/1999 | Konya | |
| 5,949,044 A | 9/1999 | Walker et al. | |
| 5,963,647 A * | 10/1999 | Downing et al. | 705/39 |
| 5,974,146 A | 10/1999 | Randle et al. | |
| 6,039,250 A | 3/2000 | Ito et al. | |
| 7,206,768 B1 * | 4/2007 | deGroeve et al. | 705/54 |
| 7,366,698 B1 * | 4/2008 | Loy | 705/40 |
| 7,415,442 B1 * | 8/2008 | Battaglini et al. | 705/64 |
| 7,454,376 B1 * | 11/2008 | Argenbright | 705/36 R |
| 2002/0052841 A1 * | 5/2002 | Guthrie et al. | 705/40 |
| 2002/0087467 A1 * | 7/2002 | Mascavage et al. | 705/39 |
| 2003/0149662 A1 * | 8/2003 | Shore | 705/39 |

FOREIGN PATENT DOCUMENTS

| | | |
|---|---|---|
| CA | 2227768 A1 | 2/1997 |
| CA | 2269618 A1 | 4/1998 |
| WO | WO 00/30051 A1 | 5/2000 |
| WO | WO 00/75889 A2 | 12/2000 |

OTHER PUBLICATIONS

Passas, Nikos, Informal Value Transfer Systems and Criminal Organizations: a study into so-called underground banking networks (see pp. 13-19).

* cited by examiner

Figure 8
A) PAYER INITIATES A PAYMENT
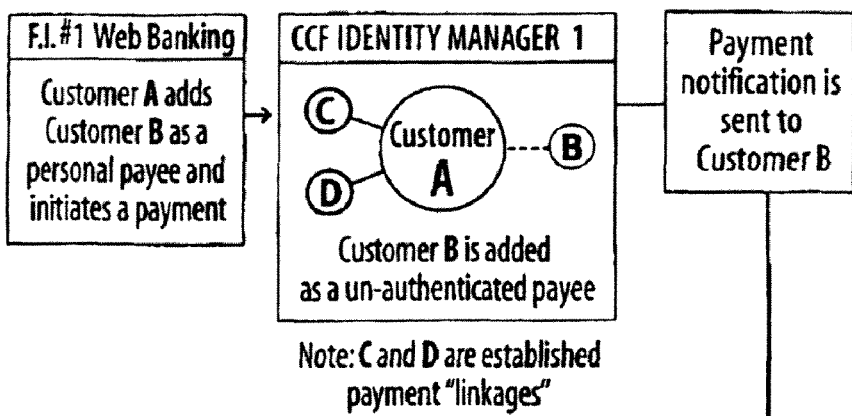
B) PAYEE RETRIEVES FUNDS
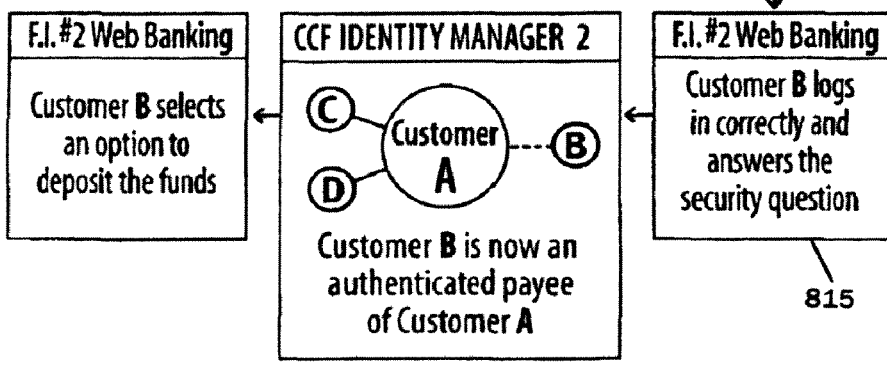

SEND A P2P PAYMENT

Security Question (Step 3 of 3)

[Select a question ▼]   OR   [Customize your own question here]

Response

[                              ]

You must use the format dd-mm-yyyy if the response is a date

The response is not case-sensitive (e.g. "R" and "r" are both recognized as correct)

Spaces between words are allowable and are recognized as text characters

Additional Security (optional)

☐ The recipient must answer the security question everytime they receive a payment ☐ Add a second security question

[BACK]   [CANCEL]   [NEXT]

911 —

⑤

YOUR P2P PAYMENT HAS BEEN SENT

Refer to the P2P Payment # or Transaction Confirmation ID if you have any questions.

P2P Payment # XXXXXXX

| | |
|---:|---|
| Sent to: | [          ] |
| Amount: | [          ] |
| From Account: | [          ] |
| Updated Balance: | [          ] |
| Memo: | [          ] |
| Security Question: | [          ] |
| Response: | [          ] |

Transaction Confirmation ID: XXXXXXX

[OK]

Figure 10
(email notification)

1001

MESSAGE HEADER

Email Cheque # 09823489

Amount : $100.00 CAD via 123 Bank

Sent by : Jane Smith (jane@work.com)

Memo: Hi Rich – 'Here's the money I owe you.

---

HOW would you like to collect your payment?

a) Deposit to your BANK ACCOUNT https://www.certapay.com/bank-account.cfm?pmtID=09823489 b) Credit your CREDIT CARD https://www.certapay.com/credit-card.cfm?pmtID=09823489

---

Need Help?

http://www.certapay.com/questions.cfm?pmtID=09823489

Parlez-vous francais?

http://www.certapay.com/bienvenue.cfm?pmtID=09823489

Figure 12

DEPSOIT YOUR TRANSFER  [Français]  [Help]

Deposit Options
Transfer Details

Reference ##: _____
Pay to the Order of: _____
Memo: _____
Amount: _____

Where would you like to deposit this transfer?
☐ Bank A
☐ Bank B
☐ Bank C
☐ Bank D
☐ Bank F

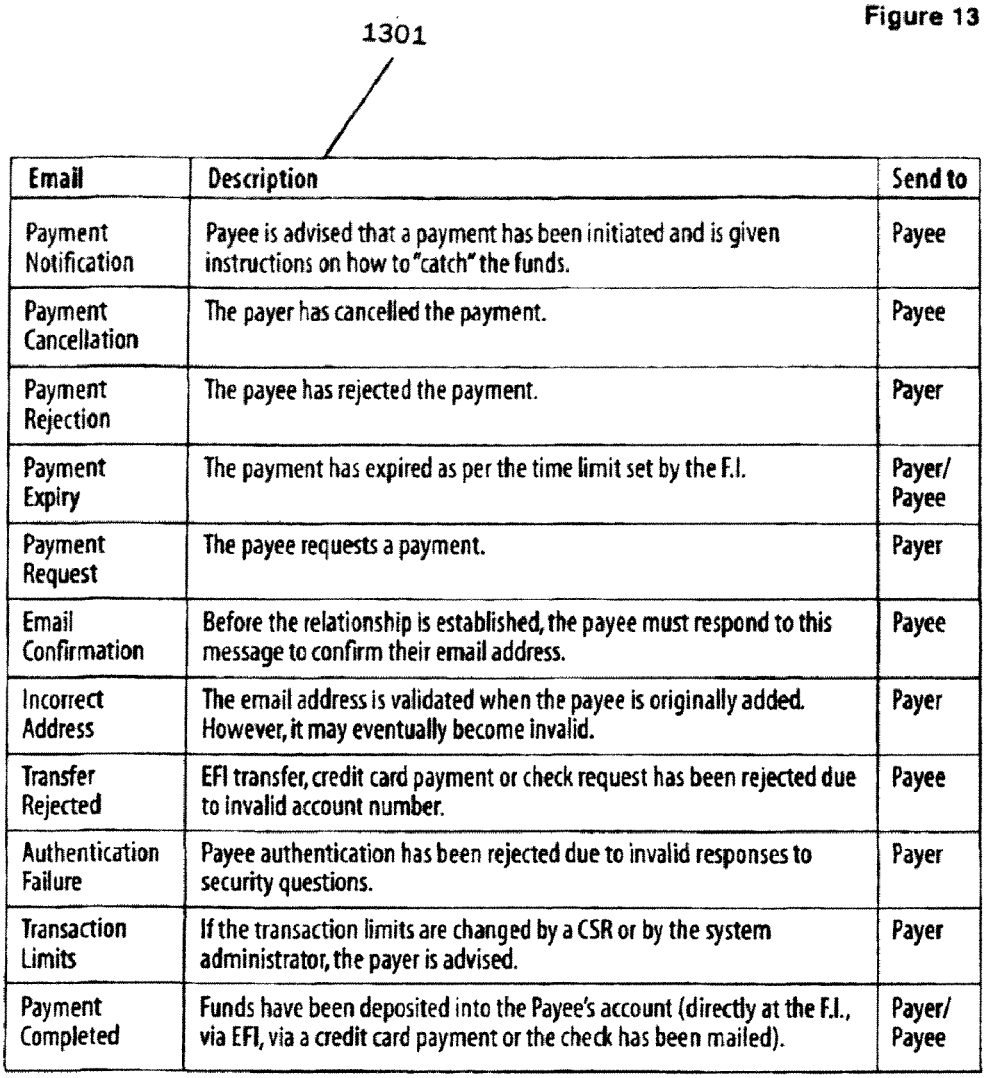

| Email | Description | Send to |
|---|---|---|
| Payment Notification | Payee is advised that a payment has been initiated and is given instructions on how to "catch" the funds. | Payee |
| Payment Cancellation | The payer has cancelled the payment. | Payee |
| Payment Rejection | The payee has rejected the payment. | Payer |
| Payment Expiry | The payment has expired as per the time limit set by the F.I. | Payer/ Payee |
| Payment Request | The payee requests a payment. | Payer |
| Email Confirmation | Before the relationship is established, the payee must respond to this message to confirm their email address. | Payee |
| Incorrect Address | The email address is validated when the payee is originally added. However, it may eventually become invalid. | Payer |
| Transfer Rejected | EFI transfer, credit card payment or check request has been rejected due to invalid account number. | Payee |
| Authentication Failure | Payee authentication has been rejected due to invalid responses to security questions. | Payer |
| Transaction Limits | If the transaction limits are changed by a CSR or by the system administrator, the payer is advised. | Payer |
| Payment Completed | Funds have been deposited into the Payee's account (directly at the F.I., via EFI, via a credit card payment or the check has been mailed). | Payer/ Payee |

Figure 15

| Message | What it does | Used by |
|---|---|---|
| Add Payee | Customer adds a new payee by specifying the name and email address. | Consumer |
| List Payees | F.I. submits a consumer's ID number. CCF returns a list of personal payees associated with that consumer. | Consumer |
| Request Payment | F.I. submits the information required to initiate a payment. CCF validates all of the information against security parameters, launches a payment notification, and returns a transaction reference number. | Consumer |
| View payments | F.I. submits a consumer's ID number. CCF returns a list of all outgoing and incoming payments for that consumer. | Consumer |
| Trace payment | F.I. submits a payment reference number. CCF returns the payment's status and any activity undertaken against it. | Consumer |
| Cancel payment | F.I. submits a payment reference number for a payment status as "pending." CCF cancels the payment, notifies the payee, and sends the payer a notification to allow them to recredit their account. | Consumer |
| Receive payment | F.I. submits the reference ID that they get when a consumer clicks on the specially coded link located on the payment email (and authenticates with their online banking service). CCF provides the challenge/response questions and required formats. | F.I. uses this to validate the payee |
| Authenticate payee | F.I. submits the consumer's responses to challenge response questions. CCF compares the questions to the answer on file and returns an authorization to the F.I. to proceed with presenting a list of accounts for the consumer to receive the disbursement. | F.I. uses this to validate the payee |
| Complete payment | F.I. submits the transaction reference number after disbursing funds to the consumer. CCF re-statuses the payments as "complete" and updates the accounting register. | F.I. uses this to status the transaction |

ONLINE PAYMENT TRANSFER AND IDENTITY MANAGEMENT SYSTEM AND METHOD

FIELD OF INVENTION

The present invention relates to a system and method for online monetary transfers. In particular, the invention relates to an online payment and identity management system and method for delivering payments from a financial institution over a global computer network.

BACKGROUND OF THE INVENTION

In the recent past a number of non-financial institution technology firms have bypassed banks by launching independent, Internet-based person-to-person (P2P) payment mechanisms. Most such services require consumers to register and debit a credit card or bank account before sending a payment. Recipients of payments receive email notifications with a specially coded link to register and authenticate before receiving several payment options, such as depositing into a bank or credit card account.

Due to consumer demand and the "viral" nature of these mechanisms (by compelling recipients to register in order to collect payments), uptake has been significant. Consumers want a convenient Internet mechanism to pay for online purchases and to replace "one-off" checks and cash payments, both domestically and internationally. For example, consider the millions of consumers who regularly wire money to family members that live abroad. For traditional financial institutions, the advent of P2P payments represents both a threat and an opportunity. Banks risk losing customer relationships to third-parties that will quickly try to expand their offerings into other traditional banking functions, competing with online checking accounts, business accounts and merchant payment services.

With non-bank start-ups acquiring P2P market share, banks risk never recouping their massive investments in online infrastructure. Once a non-bank has entered the P2P payment transfer market, there is an opportunity to go beyond free P2P payments and offer consumers a fill range of financial services, such as interest bearing sweep accounts, low-fee mutual funds and business accounts equipped to accept merchant payment.

Unlike other pure-play Internet banks, which have spent millions of dollars on advertising to promote their brands, non-bank P2P payment transfer firms have employed P2P payments to drive the initial adoption of their service and, in the process, have significantly reduced the average customer acquisition cost. Once a non-bank P2P provider makes inroads into a bank's customer relationships, it becomes easier to gain further ground. As a result, financial institutions face the danger of disintermediation by aggressive non-bank up-starts. Demand for such services has been so high that some banks are offering P2P payments to position themselves against third-parties and to acquire online customers. They include portals designed to aggressively capture new clients.

Competition with on-line banking services is arising from other payment providers in other forms as well, such as auction payments, online gift certificates, event, micropayments and stored-value, payment processing, global payments and specialty consumer payments. Most of these P2P payment services are positioned to operate outside of the traditional financial system. As such, consumers are forced to use third-party P2P services requiring personal financial information. This raises a number of privacy and security concerns. Moreover, poor performance by a non-bank third party (which is typically not regulated to the extent that banks and other financial institutions are) can undermine consumers' perception of the reliability of on-line financial service transactions generally.

Furthermore, consumers are suffering from password fatigue, and many are looking to simplify the manner in which day to day transactions and activities are conducted. Consumers look to their banks, which have already established the requisite credibility in financial dealings, to offer additional services from their core banking relationship.

SUMMARY OF THE INVENTION

The present invention provides a person-to-person (P2P) payment platform and identity management system which facilitates online banking by allowing bank customers to send and receive money in real-time, with no special registration requirement outside of the customers' existing banking relationship, and under the security, brand and control of their own respective banks.

The invention provides an invisible application service provider in the form of a central clearing facility (CCF) which coordinates and manages payments for customers, nationally and internationally, through partner financial institutions. According to the invention, customers send payments from within their online banking accounts, under their bank's existing authentication and security. Thus, customers can transfer money directly from an existing online banking offering without setting up separate accounts profiles and passwords. Customers trust banks to move money more securely than non-bank third-parties, and as such will more readily respond to a payment solution offered under their bank's security provisions.

The CCF is invisible, and effectively operates under the bank's brand so the bank retains the entire customer goodwill and developed brand recognition. In addition, each payment, in particular those delivered by e-mail, prompts recipients who don't bank online to sign up for their bank's Internet-based services to deposit payments directly into their accounts, thus increasing the bank's goodwill and facilitating the cross-selling of financial services. The e-mail payment option is a high-demand functionality that provides recognizable customer value and replaces customer inconvenience with real-time transactions and convenience to create more positive customer experiences. In addition to being able to initiate and receive payments using online banking services accessible via the web, customers can also utilize automated teller machines (ATMs), wireless networks, telephone, and any other access means provided by the financial institution to its customers.

In the preferred embodiment, to make a P2P payment the customer:

1. Accesses the online banking service;
2. Selects a recipient from a list of past payees or enters new recipient information to create a new payee;
3. Specifies a payment amount, the account from which to draw the funds, and optionally an expiry date and a personalized message to the recipient; and
4. Confirms the transaction to authorize the bank to draw the funds, following which notification is sent to the recipient advising of payment with referrals to various methods of collection; and
5. Receives a confirmation message when the recipient accepts the payment.

The recipient may:
1. "Web enable" an existing account or open online banking services;
2. Deposit the payment into any bank account;
3. Deposit the funds into a credit card account;
4. Request delivery of a paper check; or
5. Receive funds directly if the online banking service is an ATM.

The invention thus renders P2P payments under the control of the bank and eliminates the need for the bank's customers to use a third-party service. The bank controls all front-end consumer touchpoints including end-user communications. The bank also has the ability to control how P2P payment capability drives new revenue sources, cuts costs and increases market share, to create new revenue streams, reduce acquisition costs of new customers, increase marketing and cross-sell opportunities and reduce dependence on less efficient delivery channels.

The invention supports different frequencies of payment and multiple currencies, and can be deployed on all bank delivery channels, including wireless services. All of these services can generate new revenue opportunities for online business, complemented with tools that enable the bank to track and control usage.

The CCF's infrastructure is secure and scalable, able to employ the latest encryption technologies and security measures to deliver sound and secure transactions. The invention allows the bank to determine and configure a wide array of security parameters, such as maximum transaction limits, to suit each particular institution's risk tolerances. If payments are undeliverable or unretrieved, the sender can have the funds re-credited to their bank account or re-send the payment. A simple, yet robust data interface enables the bank's Internet service to connect quickly and securely to the CCF central facility with minimal diversion of its technical resources.

The invention thus builds on the bank's relationship with its client, by adding new functionality to block out third-party online financial service providers and strengthen the existing relationship. Moreover, the invention forecloses the need for account, ID, password and other inconvenient administrative requirements that third-party financial services providers must ask of consumers. The bank has the opportunity to leverage existing security and Internet payment infrastructures, replace consumer inconvenience with convenience and provide a facility for real-time email payments between customers of the same or different financial institutions.

The CCF can coordinate payment transactions between customers banking at both partner and non-partner financial institutions. It handles and stores all of the payment relationships among customers and manages the authentication and approval of fund disbursements to payment recipients.

BRIEF DESCRIPTION OF THE DRAWINGS

In drawings which illustrate by way of example only a preferred embodiment of the invention, FIG. 8 is a block diagram illustrating an identity management system according to the invention, FIGS. 9a and 9b are diagrammatic illustrations of a sequence of user interfaces for a payer sending a payment, FIG. 10 is a diagrammatic illustration of a sample of a message to a payee, FIG. 12 is a diagrammatic illustration of a user interface for a payee retrieving a payment, FIG. 13 is a table illustrating user notifications generated according to the invention, FIG. 15 is a table illustrating a sample message sets.

DETAILED DESCRIPTION OF THE INVENTION

The system and method of the invention enables customers of a financial institution having access to banking services over a global computer network such as the Internet to initiate electronic payments conveniently and securely from their financial institution's self-service delivery channels (Online banking service, ATM, Wireless, Telephone Banking) or the financial institution's branch. The invention provides financial institutions with an easy-to-integrate mechanism to facilitate and manage person-to-person (P2P) payments, leveraging existing find transfer mechanisms that reside in the middleware of a financial institution's banking service—the component that allows customers to move money between their own accounts—thereby avoiding significant back-end development. The invention extends an institution's existing infrastructure to facilitate funds transfers in and out of consolidation trust accounts established at partner financial institutions in each supported currency.

Figure 1:
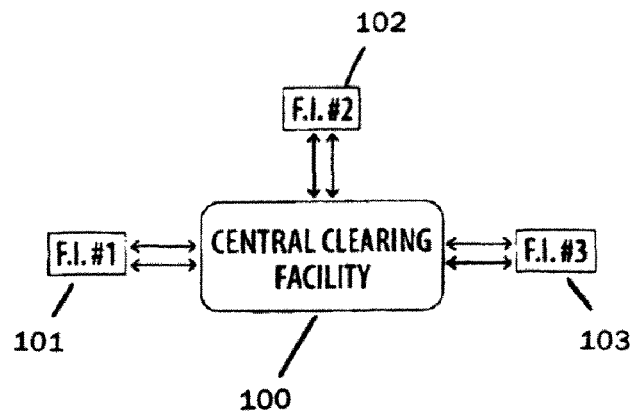
FIG. 1 is a block diagram illustrating a real-time clearing network for P2P payments according to the invention.

To process P2P payments, the invention helps partner institutions feed transaction interfaces with the appropriate account numbers, parameters and authorizations. "Netting" processes balance the positions of consolidation trust accounts across all partner financial institutions. As a result, a private, real-time clearing network is created among partner institutions to settle electronic payments initiated and caught by their customers. This allows financial institutions to maintain control over their user interface by communicating with a central clearing facility (CCF) 100, as shown in FIG. 1 through industry-standard messaging adaptors. The CCF manages the status and accounting mechanisms to ensure that users at each end of a payment transfer are validated and notified throughout each step of the transaction. The CCF features a secure, open front-end to allow users that do not currently bank at partner institutions to "catch" payments using offline mechanisms that can reach and credit most accounts. If payees do not wish to receive payment electronically, they can request a check mailed to their address or, if receiving payment at an automated teller machine (ATM), they can obtain the funds directly.

The CCF is based on an application service provider model that uses industry-standard interfaces to integrate with partner financial institutions' existing systems. The invention acts as a common platform among banks, interacting with each to support the efficient exchange of P2P payments. The net result is one of ease and efficiency: each financial institution establishes a one-to-one relationship with the CCF, eliminating the prospect of integrating disparate systems.

Figure 2:
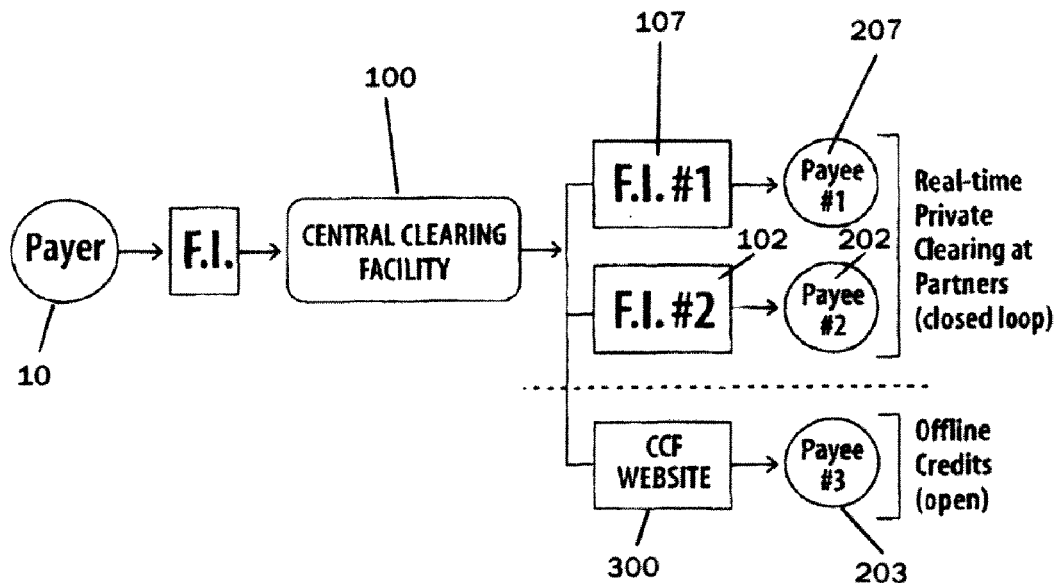
FIG. 2 is a block diagram illustrating the payor-payee relationship in the network of FIG. 1.

FIG. 1 illustrates an Application Service Provider Model which allows financial institutions to rapidly deploy P2P payments on their appropriate delivery channel (Online Banking, ATM, Wireless, etc.) To maximize security and to minimize the risk of fraud, payments are always initiated from within the authenticated layer of a partner financial institution's delivery channel. As a result, each payment that enters the system for delivery originates from a trusted source. As shown in FIGS. 1 and 2, payees can receive their funds through the originating institution 101 (Payee #1 201) or at another affiliated partner 102 (Payee #2 202). Alternatively, customers banking at unaffiliated financial institutions (Payee #3 203) can request payment through offline disbursement mechanisms offered at a secure Web site 300 powered by the CCF 100. Partner financial institutions thus become a secure, real-time clearing network for P2P payments.

Figure 3:
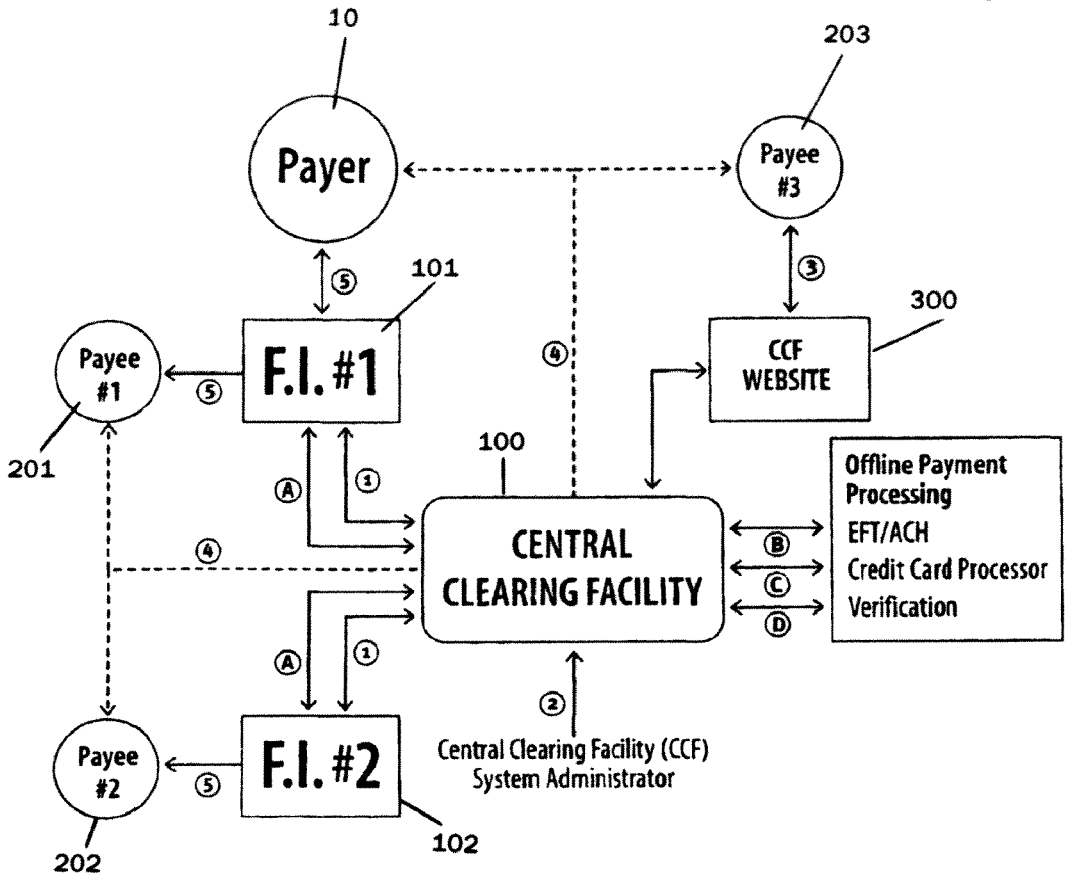
FIG. 3 is a block diagram illustrating user and data interfaces according to the invention.

The architecture of the invention, illustrated in FIG. 3, consists of data and user interfaces that facilitate the movement of money between customers. Behind the scenes, a secure CCF Web site 300 allows partner institutions to manage security, marketing and customer support centrally through sophisticated administrative and reporting tools.

Figure 4A:
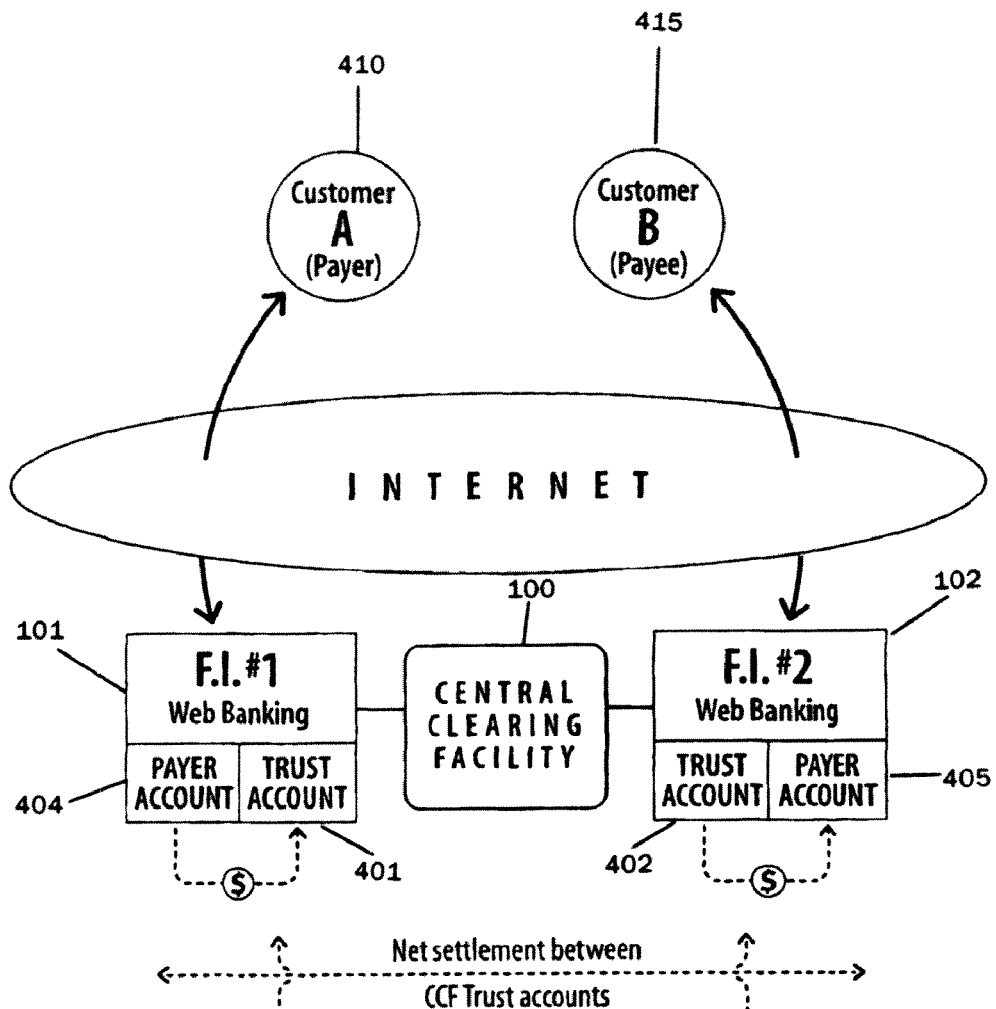
FIGS. 4a and 4b are block diagrams illustrating an online P2P payment transaction where both payer and payee bank at a partner financial institution.

To enable the flow of funds between parties, according to the invention, consolidation trust accounts 401, 402 are established by each partner financial institution 101, 102, as shown in FIG. 4a Accounts are held for each currency supported by the system. As a result, no exchange of funds between partner institutions is necessary to settle individual payments between customers 410, 415. Instead, payments are executed by transferring funds from a customer's account 404 to the consolidation trust account 401 at the originating institution 101. If the payee 415 is a customer at a partner institution 102, receipt of funds is accomplished by transferring monies in real-time from the consolidation trust account 402 at the payee's institution to the customer's account 405. Funds are available to the payee 415 for collection immediately after payment notification is sent. Collection may be effected by a withdrawal from an ATM.

Figure 5A:
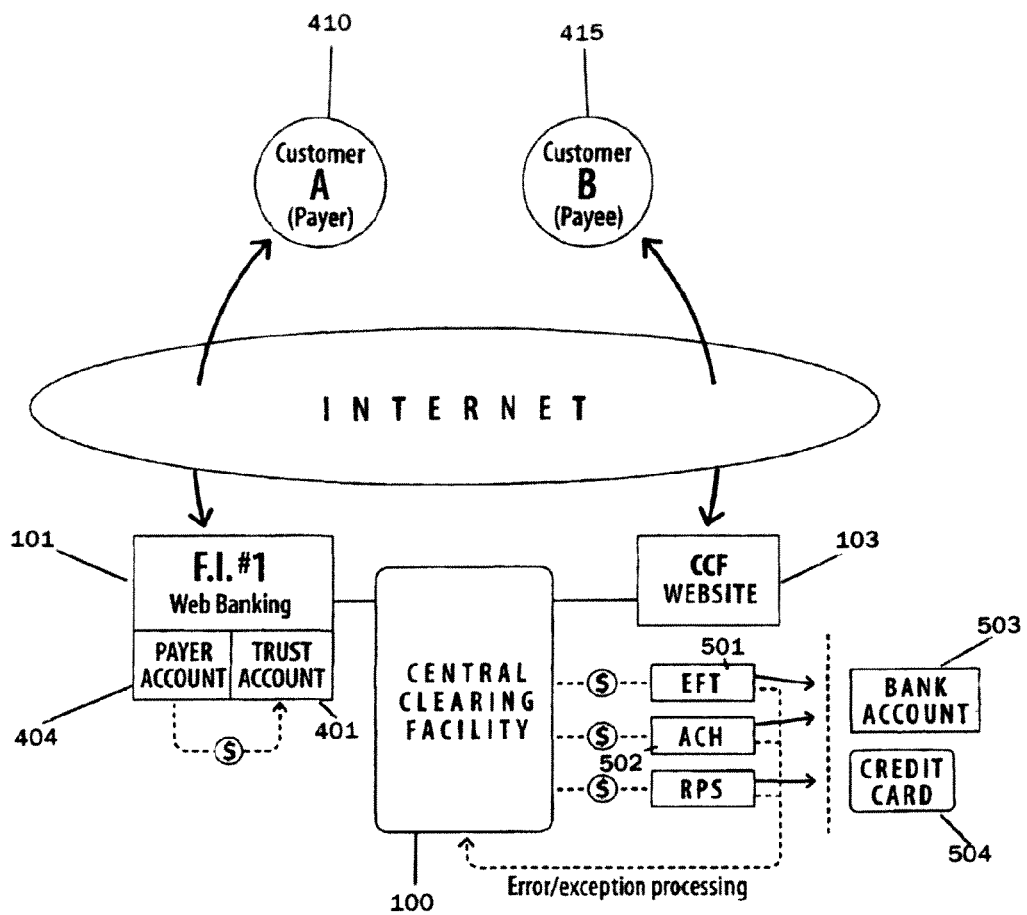
FIGS. 5a and 5b are block diagrams illustrating an offline P2P payment transaction where the payee does not bank at a partner financial institution.
Figure 5B:
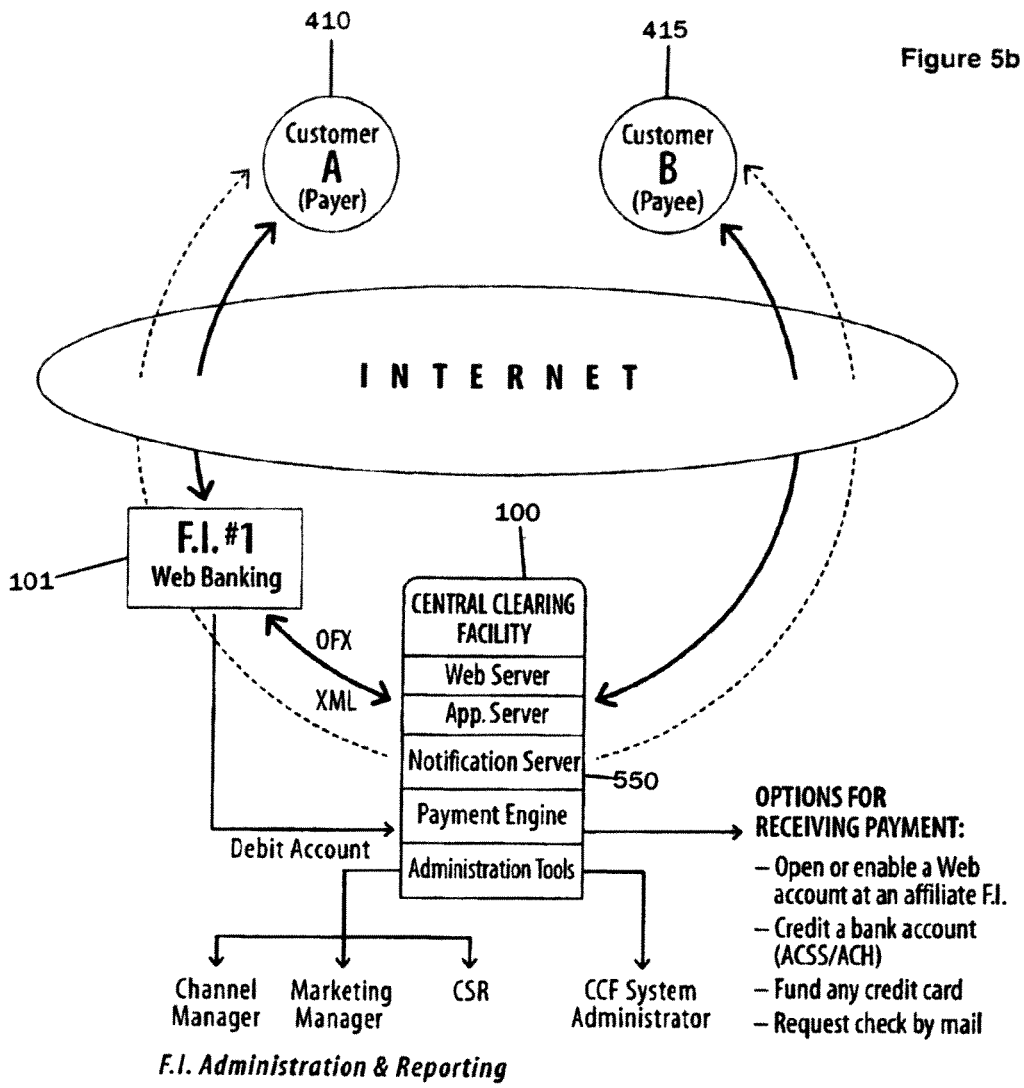

A front-end Web service 103 allows a payee 415 banking at a non-affiliated institution to specify an offline mechanism for payment retrieval. The payee can select the transfer of funds to their accounts 503 at CPA and NACHA member institutions (through an EFT 501 and ACH 502 processor, respectively) or crediting to most common credit cards through a remittance processor or payment gateway, as shown in FIGS. 5a and 5b. The invention also offers the option of a payee 415 requesting delivery of a paper check by traditional mail for a nominal processing fee deducted directly from the amount they are receiving. Batch file payments are securely transferred to processing agencies on a nightly basis. EFT, ACH and credit card disbursements typically take between one to four business days while check delivery takes from five to seven business days for North American delivery.

All communication with "offline" consumers 415 include prompts to drive adoption of a partner institution's online banking service. Through a variety of precautionary measures, described below, the invention ensures the security and validity of all payment requests and disbursements and provides detailed reporting and transaction tracing to its partner banks.

To move money between customers, the invention leverages the existing internal funds transfer module utilized by institutions to facilitate customer transfers. With a few modifications, this piece of middleware (usually located on an application server) is enabled to execute transfers between a customer's account and a consolidation trust account for disbursements. The invention operates in reverse at the recipient's end. If a payee catches a payment at a partner institution, funds are immediately transferred from a consolidation trust account into the payee's own account.

To minimize liability, funds awaiting delivery are stored in accounts at partner institutions in each supported currency. The CCF 100 controls the acceptance and disbursement of funds in these accounts, but does not take direct ownership of the money. Instead, the trust accounts are actually internal or suspense accounts maintained by the partner institutions 101 102 103, who earn the float on the funds awaiting disbursement. The CCF 100 provides a detailed accounting of all the money flowing in and out of these accounts. The CCF 100 acts as a control point, approving financial transactions undertaken by partner institutions to move funds between customer and trust accounts in real-time.

Figure 6:
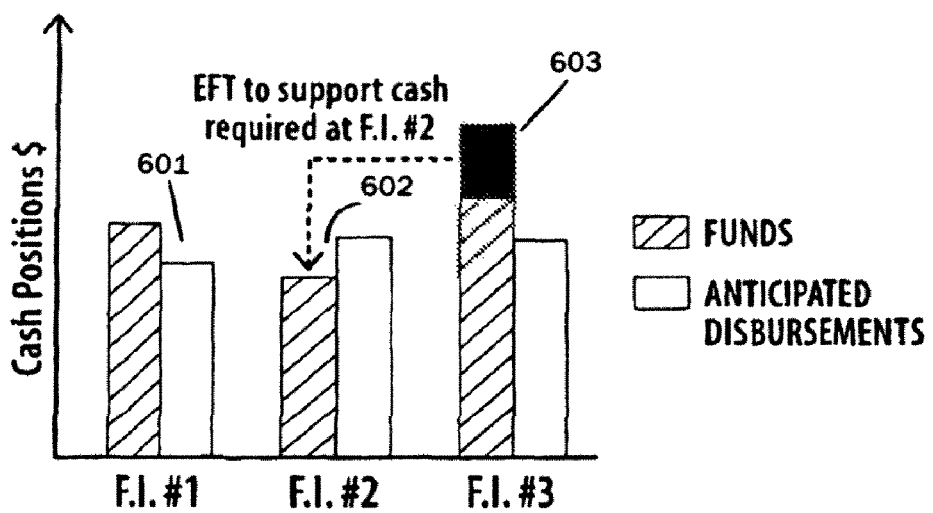
FIG. 6 is a graph illustrating account netting at a partner financial institution.

The CCF network, acts as a netting center. Instead of settling each individual transaction, the CCF 100 becomes a virtual clearinghouse, adding and subtracting inter-partner payables and receivables and then providing the partner institutions with settlement instructions to balance the trust accounts 601, 602, 603, as shown in FIG. 6.

This netting activity is captured by a robust, double-entry accounting system. A continuous transaction journal at the CCF 100 mirrors each of the trust accounts maintained at partner institutions to facilitate auditing and reporting. The system is designed for resilience and will catch accounting imbalances caused by the failure of one or more mid-operation system processes. The CCF 100 utilizes these accounting and reporting mechanisms to facilitate the following activities:

a) Daily reconciliation between the CCF 100 and its partner institutions: The CCF 100 matches transactions in its journal against those tracked by each partner institution and then reports any exceptions. Exception reports are investigated and addressed to ensure that accounts are balanced.

b) Daily settlement reporting for partner institutions. The CCF 100 calculates monetary obligations of each partner institution to all other partner institutions in the network based on the origin and destination of completed payments. Each partner institution is provided with a detail list of all corresponding payments as well as a summary of monies owed to the other partners. Partner institutions settle with each other outside of the CCF 100 by using existing large value fund transfer mechanisms available in their jurisdiction.

c) Feed the CCF's 100 finance and accounting systems: The transaction journal generates a number of accounting and control system reports.

d) Provide audit reports: Where an audit is required, the CCF 100 uses the transaction journal to generate accounting reports for all finds that have yet to be disbursed. The CCF 100 also retains historical records to facilitate account investigations.

e) Exception reporting: Partner institutions can send their client fund transaction log (covering activity in their consolidation trust accounts) to the CCF 100 to match these against the transaction journal for inconsistencies. If the two reports do not balance, an exception report is generated so that the situation can be investigated immediately and corrected if necessary.

Where the payer 410 and payee 415 are located in different jurisdictions, requiring a currency exchange, the settlement procedure incorporates a foreign exchange facility which maintains trust accounts in each jurisdiction in the local currency.

Figure 7:
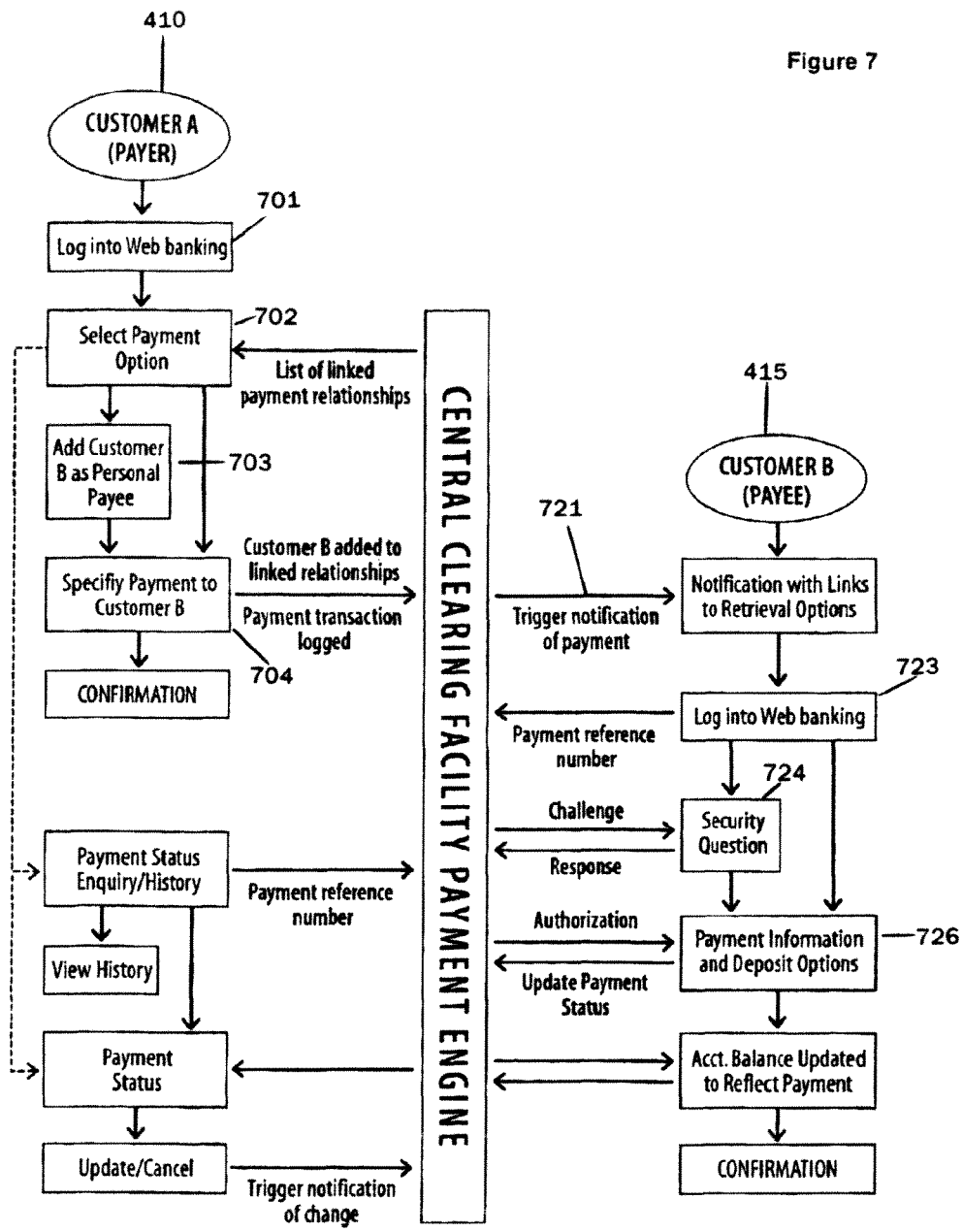
FIG. 7 is a flow diagram illustrating the navigation path for an online P2P payment transaction where both payer and payee bank at a partner financial institution.

FIG. 7 illustrates the payer and payee navigation paths where both payer 410 and payee 415 are existing clients with Web banking privileges at partner financial institutions.

As shown in FIG. 8, the invention provides an identity management system that leverages secure payment relationships between remote consumers. Each customer (payer 410 or payee 415) is granted a unique identity that is assigned when he or she first registers with the service. A payer 410 can establish a list of recurring personal payees 415 as required. While payee records are immediately added to the CCF database, they are not authenticated until they correctly answer one or more challenge-response questions defined by the payer and after successfully logging onto his or her institution's online banking service or other delivery channel 815. This process establishes both the payee and the specific "channel" where the payee has opted to deposit funds. If a customer wishes to credit an account at another institution on a subsequent transaction, the customer must re-authenticate with the original challenge-response questions before that new "channel" is secured. The challenge-response questions may include the input of a secret code provided by the payer 410 to the payee 415. In another embodiment, identity management is handled entirely by the authentication procedures of the partner institutions, thus allowing the institutions to manage the risk of fraud entirely by implementing their own security standards without the use of a payer-defined challenge-response question.

The identity management aspect of the invention provides the following advantages:

a) Increased system security: Customer account information from partner institutions is never stored at the CCF facility. The CCF 100 completes all processing against its own internal IDs, which are established when each customer auto-enrolls to send payments. Each CCF internal ID is referenced against an institution's customer user ID for message synchronization.

b) Transaction tracing: The CCF 100 holds a unique identifier for each customer it encounters. The CCF layers contact information for each customer identity in its database to facilitate notifications and authorizations. Each identity is cross-referenced back to the partner institutions' customer IDs to facilitate transactions, reporting, support and tracking without compromising personal information.

c) Enhanced consumer experience: The identity management model of the invention enables customers to retain "trusted" payment relationships to simplify future payments. These payee relationships are delivered on demand to a partner's system to encourage quick re-use of the "trusted" payee for subsequent transactions, thereby enhancing the user experience. These payee relationships can be deployed to other bank channels, such as WAP-enabled phones, through the message interface, to launch subsequent payments first established through a partner's Web banking service.

d) The consumer is validated on each channel before moving finds: Since the payment system offers customers a variety of mechanisms for "catching" payments, one may choose an account at a different partner institution into which funds are deposited on a subsequent visit. In this case, the payment system again asks the same challenge-response questions before validating the new payment channel, at which point the new account is deemed "trusted" and added to the consumer's identity.

Through the identity management function, other fraud protection and security measures are employed by the payment system in addition to the authentication of payment relationships.

a) Institution-controlled security parameters: Each institution can define security parameters that govern transactions originating from their banking service. These default parameters include transaction limits, daily transaction limits per customer and the maximum number of days before an unretrieved payment is sent back to the payer for recrediting.

b) Initiation of payments: All payments originate from within an authenticated banking environment (for example, web, telephone, wireless network, ATM, or another access point to banking services) at a partner financial institution. One can initiate an email payment only when logged on, ensuring that such transactions are validated back to customer bank accounts at partner institutions.

c) Receiving payments: The recipient must authenticate and correctly answer one or more challenge-response questions before the retrieval of funds is allowed. The partner institution controls the number and type of challenge-response questions the payee must answer before the relationship is authenticated.

d) Audit trail: A detailed audit trail records all pending and historical payments.

e) Transaction integrity: The CCF's transaction management service guarantees that database transactions are completed accurately. If any one operation fails, the entire set of operations is rolled back. A global transaction identifier is created when a client application initiates a transaction. The transaction service monitors participants for failures and inactivity. Records accessed during a transaction are locked until its completion. A rollback procedure is executed when a transaction must be stopped due to unexpected client termination, server/network failure or other events that may interrupt end-to-end completion of the transaction. This procedure checks recently active transactions and then determines whether it should be rolled back or committed.

A number of measures ensure the security of customer data. The CCF 100 does not store a partner institution's customer account numbers. Data related to customers banking at unaffiliated institutions are stored in a secure database, which is located behind a firewall and encryption processes. Administrative user IDs and passwords are stored behind a firewall in an encrypted format. Administrative users can define multiple security groups and access restrictions in accordance to job function. Challenge-response questions provide an extra mechanism for authenticating the payee in addition to existing logon processes at the payee's own Web banking service. The network connecting partner institutions, administrative users and unaffiliated consumers is divided into several isolation and security zones with restricted access among zones.

Industry-standard measures are used throughout the network to ensure security. Intrusion detection devices, traffic encryption, packet inspection and application proxies minimize risk to the network. All communications between the CCF 100 and its partner institutions take place over a dedicated line or VPN and are encrypted.

A number of exception processes and error handling mechanisms further ensure the CCF's integrity:

a) Undeliverable payments: If the payer specifies an invalid email address and the resulting notification bounces back to the server, the payer is automatically contacted and presented the option to re-credit his or her account or correct the recipient's email address to resend the payment notification.

b) Unretrieved (or expired) payments: With the CCF's back-office administration tool, affiliate institutions can each define a maximum period of time before a payment expires if uncollected by a payee. On a daily basis, the system will run a task to detect all expired payments. Notifications are sent to the payer and payee indicating expiration. The payer is then presented with the option to send it again or transfer the funds back into a specified account.

c) Cancelled payments: At any time before retrieval, the payer 410 can cancel a payment. After logging on to the originating Web banking facility or other delivery channel, the payer 410 simply cancels the payment transaction by indicating the account to be credited and sending an optional memo indicating why the payment was cancelled. The institution's banking service then sends a message to the CCF 100 containing the payment reference number. The CCF 100 will verify that the payee 415 has not retrieved the funds and the system will change the payment status to 'Cancelled' while sending notification to the payee 415.

d) Rejected payments: The payee 415 can reject a payment transaction from within the authenticated Web banking environment of an affiliate institution or upon authentication at the CCF Web site 300. If the payment is rejected, an email is sent to the payer 410 with instructions to log on to his or her Web banking facility or other delivery channel to select an account to re-credit the funds.

e) Invalid account information: If payees 415 select an offline electronic method to catch a payment, there exists the potential that incorrect account information might have been entered despite the processes performed at the interface layer. Transactions that cannot be completed through the ACH/EFT/RPS processing facilities are returned to the CCF 100. The payee 415 is then notified of the problem and given an opportunity to re-enter the account information or specify an alternate means of retrieval. If the subsequent attempts fail to deposit the funds into the payee's designated account, the funds are returned to the payer and both parties are appropriately notified.

f) Reconciliation process: On a daily basis, each partner institution 101, 102, 103 sends a file containing all transfers to and from the partner's consolidation trust accounts. Payment reference numbers are reconciled against information stored at the CCF 100.

Figure 9A:
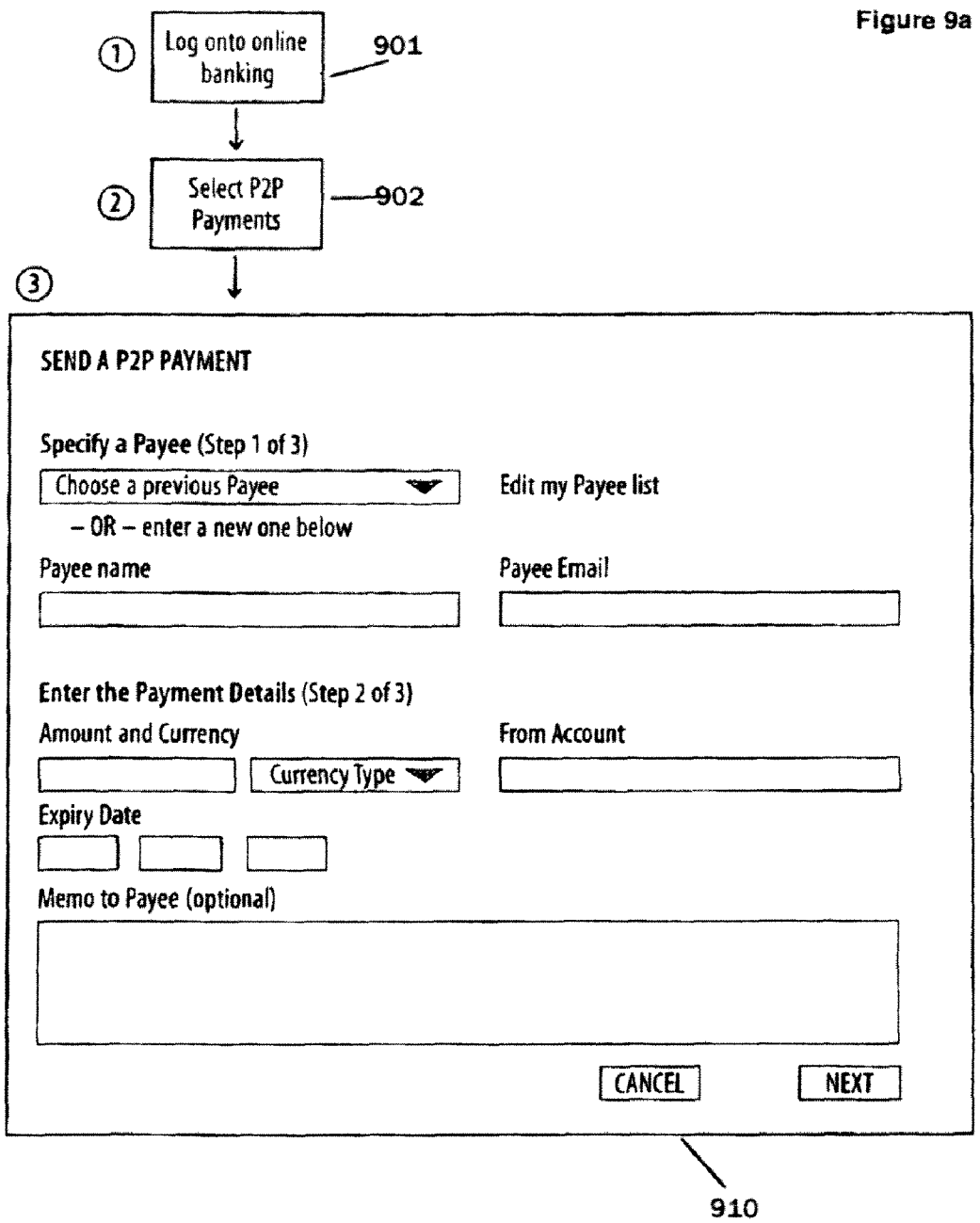
Figure 18:
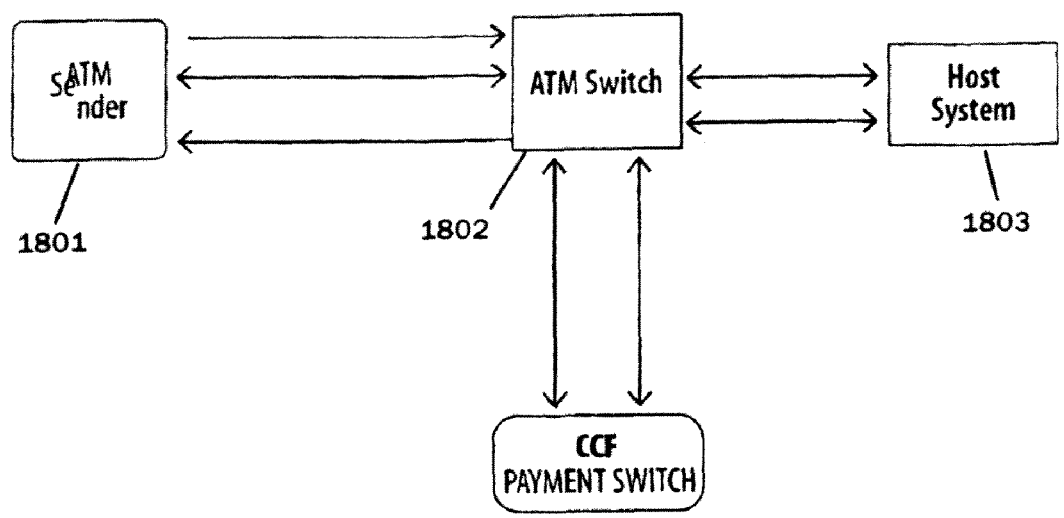
FIG. 18 is a block diagram illustrating an online P2P payment where the payee receives payment at an ATM.

With reference to FIGS. 7, 9a and 18, a P2P payment may take place as follows:

To initiate a P2P payment, the customer logs onto the partner institution's online banking service 901 via the web, telephone, wireless network, ATM (as shown in FIG. 18), or other means at 701 in FIG. 7. The customer selects 702 the payment feature 902 from the financial institution's menu of services and chooses from their list of prior payees. To enter a new recipient, the customer is prompted to enter the payee's name and e-mail address 703, if notification of the payment is to be delivered by e-mail to the payee. The customer specifies 704 payment amount, the account from which to draw the funds are specified, and optionally an expiry date and a personalized message to the recipient as shown at 910. To add an additional security measure to validate the recipient before fluids are disbursed, the customer can create one or more challenge-response questions and provide the requisite answers as shown at 911 in FIG. 9b. Referring to FIG. 18, If the customer 1801 logs on using an ATM, these payment details are communicated from the ATM to the ATM switch 1802. As well, the customer is authenticated using the institution's security standards; where the customer logs onto an ATM, authentication of the customer is handled by the ATM switch 1802 in communication with the host system 1803 of the banking service. The payment details are communicated by the ATM switch 1802 to the CCF 100 (not shown in FIG. 18), which assigns a unique payment reference number and communicates this number to the ATM switch 1802. The ATM switch 1802 then communicates with the host system 1803, and the customer's account is debited for the payment and the financial institution's trust suspense account is correspondingly credited. The ATM switch 1802 communicates with the ATM to cause the ATM to provide a receipt to the customer 1801, which includes the payment reference number, then communicates the successful completion of this portion of the transaction to the CCF 100. Notification is delivered to the recipient announcing the payment 721.

The recipient's personalized notification indicates the amount being paid, from whom, the name of the originating institution, as well as options for collection. In one embodiment, the notification takes the form of a personalized e-mail 1001 to the recipient, as shown in FIG. 10. The payment's originating institution may promote its services through banner advertisements in the body of the message. The invention provides multiple options for retrieving finds, as shown in 1103 in FIG. 11.

Figure 11:
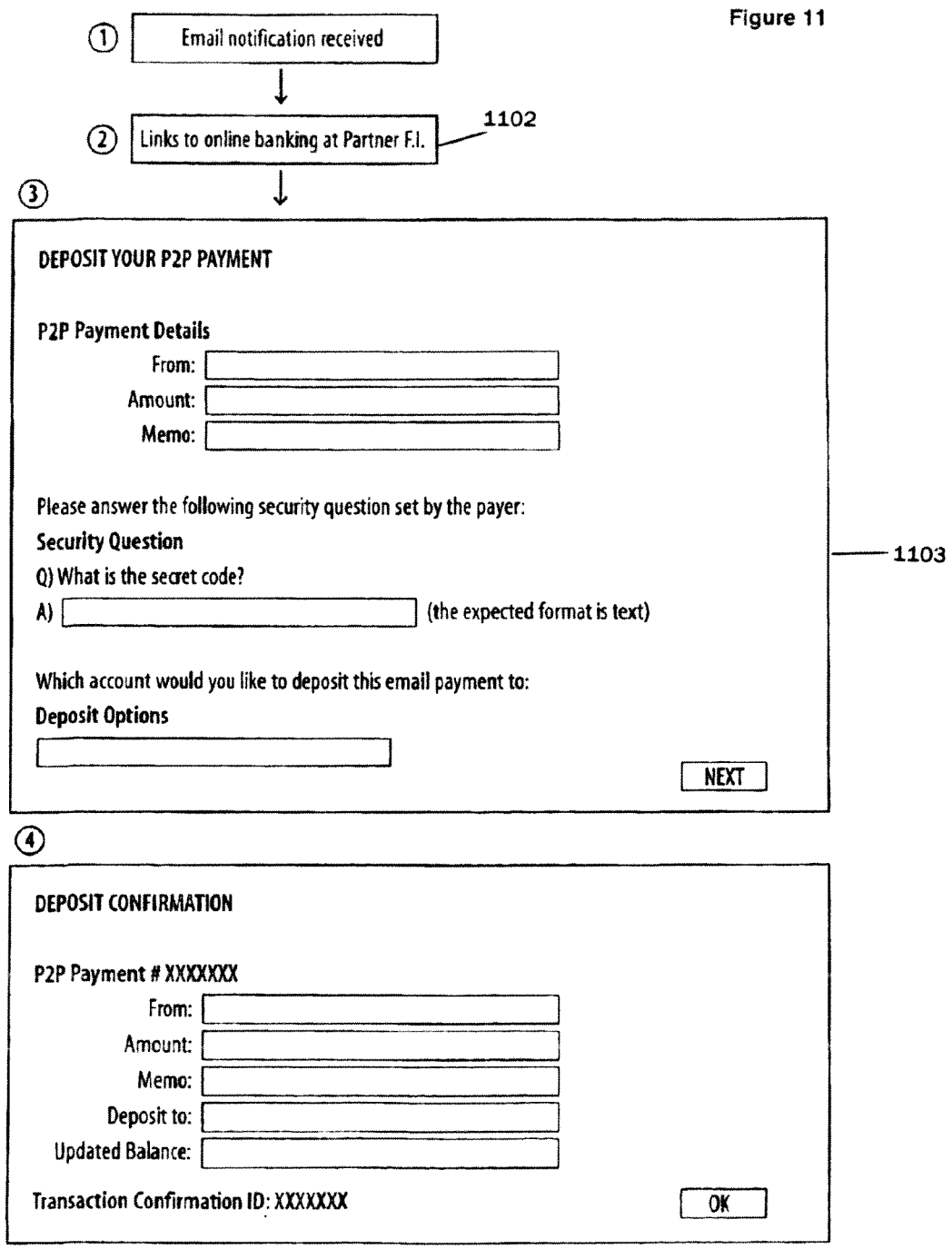
FIG. 11 is a diagrammatic illustration of user interfaces for payee identity authentication.

If the recipient already banks online with a partner institution and has previously received an electronic payment via this system, the recipient may select from a list of payment options to log onto their online bank account straight from a link provided in the e-mail notification of payment at 1102 in FIG. 11, optionally identifies the payment by reference number and answer the challenge-response question if it is the first payment from that particular sender. This validates the relationship between both parties. The recipient may choose to log onto their online bank account 723 using another communications protocol, such as via a wireless network, telephone, or ATM.

If the recipient banks online with a partner institution, but is receiving a P2P payment for the very first time, a link in the e-mail notification sends the customer to a directory of CCF partner institutions. Recipients can use their online banking service to instantly credit any of their accounts. The registration process is fully automated.

Recipients, who are not currently banking online, are prompted to either "Web enable" their existing accounts at a CCF partner institution (such as the sender's bank) or apply for an account with online access at another partner, as shown in 1201 in FIG. 12. To facilitate this process, the CCF Web site provides all appropriate links and information. Currently, the enrollment process for acquiring online banking services at a financial institution can take anywhere from a few minutes to a few weeks, especially if passwords must be issued by mail. In the case of a delay, the CCF will hold the payment for the appropriate number of days; customers must wait for their account to be activated at a partner institution. An e-mail reminder is sent to the customer to activate the service and retrieve their funds.

The recipient then selects the account into which to deposit the funds 726. The institution validates the recipient's identity, and communicates the payment details to the CCF 100, which verifies the payment and issues permission to disburse the money. The financial institution then debits a suspense account, and credits the recipient's account for the payment. If the recipient chooses to receive the funds directly, a cash account is credited instead and the finds are disbursed. Once the funds credit or disbursement is completed, the CCF 100 is informed of the successful completion. The finds may be advanced immediately by the recipient's institution, because the finds have been guaranteed by the originating institution's verification of the identity of the sender.

The complete payment transaction is decentralized; the first component, the initiation of payment, is controlled by the sender's financial institution, and the second component of the transaction, the receipt of the payment, is controlled by the recipient's institution. It can also be seen that due to the authentication of each party to the transaction independently, by each party's own financial institution, the payer's identity does not need to be known by the payee in order to effect payment. The payer may use an alias or e-mail address only, if desired, in communication with the payee.

The funds may alternatively be deposited to a credit card or other bank account. To provide maximum payment reach, the CCF 100 processes payments to non-partner accounts on a fee-for-service basis. Recipients may opt to deposit the payment into a credit card or other bank account not sponsored by a partner institution. Recipients are directed to the CCF Web site 300, where they can register for the service. When registered, recipients specify a credit card or bank account into which to deposit the funds. Such requests are batched and sent each day to payment processing services to be credited via ACSS, ACH and RPS services.

Payment recipients who require a check or are uncomfortable making transactions online, can request the CCF 100 to issue a paper check for mail delivery. At every turn, payment recipients are prompted to use a partner institution to receive their funds. If they choose to receive a payment using a non-partner mechanism, the CCF 100 will facilitate the transaction through its Web site.

In a further embodiment, payments may be made to a recipient who does not have a bank account via an ATM and is not registered with the CCF 100. The ATM, rather than requiring a bank card to initiate any transaction, provides direct access to the menu option to receive a P2P payment. To verify the identity of the recipient, since there is no bank card authentication, preferably the recipient must at least respond to the challenge-response question 724 and/or provide the payment reference number. The ATM will communicate these payment details to the CCF 100, which will verify the payment and issue permission to disburse the money.

Figure 4B:
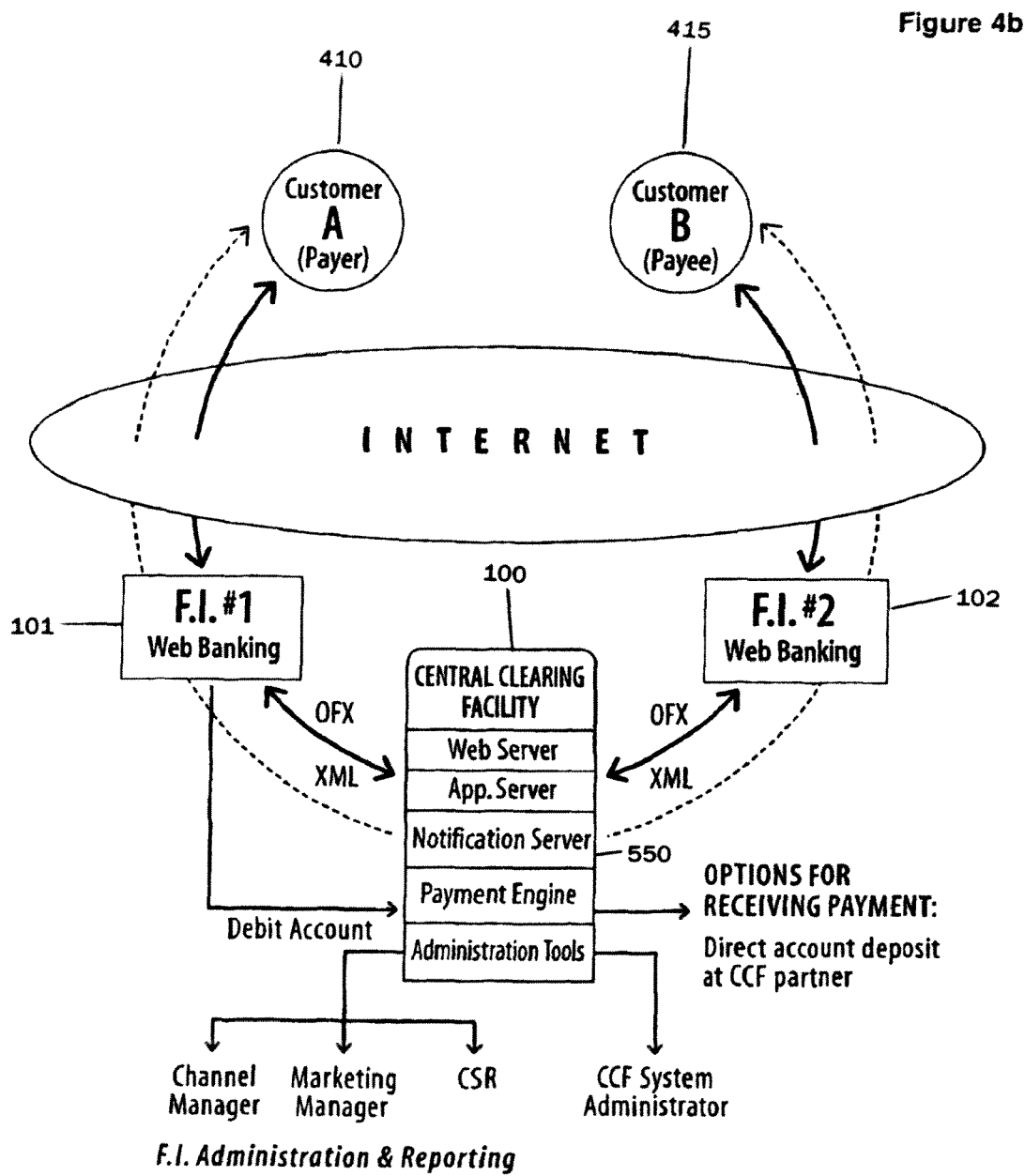

The CCF's notification server 550, shown in FIGS. 4b and 5b, provides information to both parties regarding the status of a payment transaction. Each of the messages is based on a standard template, so that the payee receives the same message irrespective of the originating partner institution. Notifications have multilingual capabilities. FIG. 13 shows options 1301 for end-user notifications generated by the system of the invention.

Payments between businesses and businesses, or between businesses and customers, follow the same format as the payments described above. However, if a large number of payments are transacted, it becomes impracticable for a business to log on and collect each payment as they arrive. Instead, business customers of participating institutions may enroll in a commercial registry which provides a funds consolidation function.

Business customers who choose to participate in the commercial registry are first qualified for participation and enrolled by their institution. The institution in turn provides this certified business customer information to a CCF commercial registry, which is used to validate and certify the identity and contact information of the business company as a legitimate operating concern with a bona fide banking relationship when payment transactions are initiated. Preferably, this information will include the official name, address, and contact information of the business, trade name, and a verified e-mail address.

A subset of this financial institution-certified information is available to any individual or business that receives a payment request or wishes to originate a merchant payment to this business customer, which provides assurance that the funds are being directed to the appropriate recipient.

Figure 19:
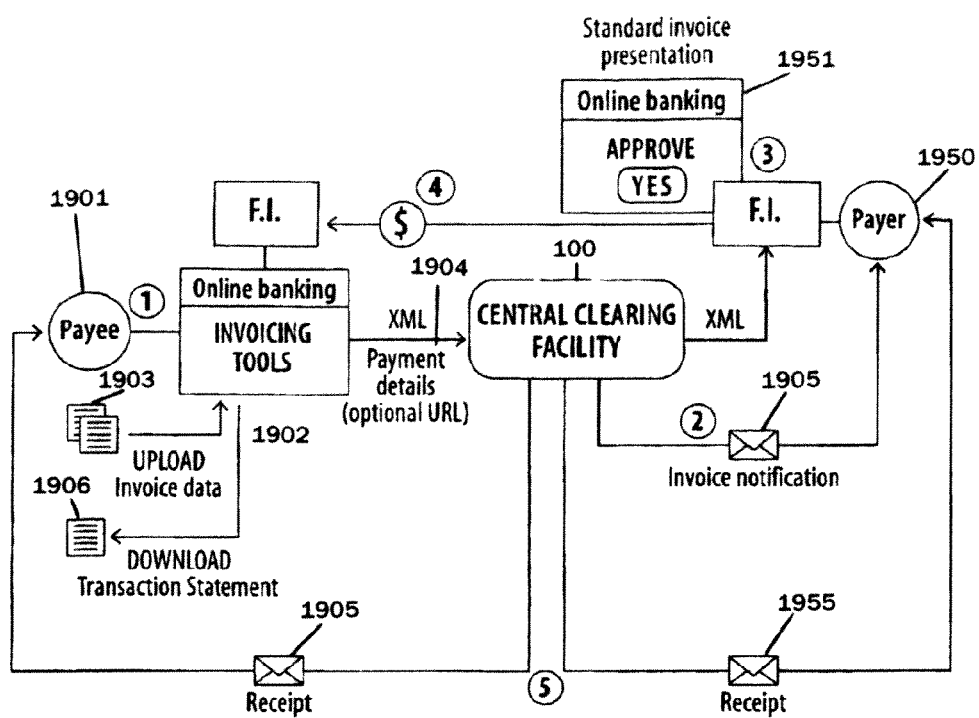
FIG. 19 is a block diagram illustrating an online P2P payment between businesses.

A business customer may generate a payment request for one of its own customers by delivering an invoice and directing the customer to access his or her own financial institution services to effect payment to the business as shown in FIG. 19. The business customer 1901 logs onto its partner institution's online banking service 1902 and enters invoice data either manually or by importing a payment file 1903 from a third party accounting tool. The partner institution transfers the payment details 1904 to the CCF 100, which assigns a tracking number and optionally a universal resource locator (URL). The payment details are stored by the CCF 100, which then notifies the customer (payer) 1950 of the invoice. Preferably, the invoice is delivered by e-mail 1908 and directs the customer 1950 to its partner institution's online banking service 1951. The customer may choose to approve payment immediately, or may choose to view additional information regarding the invoice if such information is available (for example, through the URL or another hyperlink). When the payment is approved, the CCF 100 completes the payment in the manner described above and issues a receipt 1905, 1955 to both parties. The business customer can then log onto its institution's online banking service 1902 to collect the funds and optionally export transaction statements 1906 to a third party accounting tool.

Figure 20:
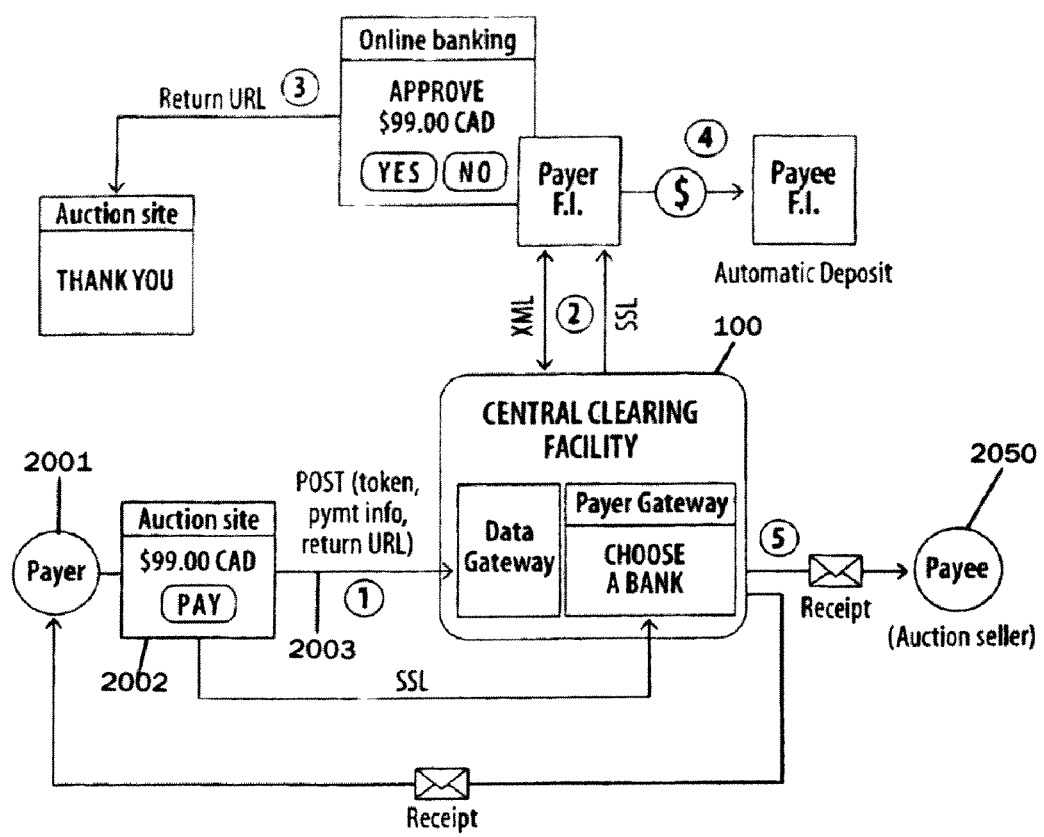
FIG. 20 is a block diagram illustrating an online P2P payment between a customer and a retailer.

In another embodiment, shown in FIG. 20, no invoice is issued to the customer 2001, but the customer initiates the payment as part of a retail transaction in an online environment. For example, in a web-based auction, the customer clicks on a "pay me" link appearing in a vendor's auction listing 2002. Clicking on this link passes payment details 2003 to the CCF 100, together with a token identifying the vendor 2050 and an optional return URL. In the meantime, the customer is referred to a partner institution, approves the transaction, and the payment is completed as generally described above.

When the payment is made, the business customer 2050 can choose to receive notification of each payment, and choose a deposit account and collect the funds. Alternatively, because it is impractical for the business customer to respond in this manner to a large number of payments, the payment system can be configured to consolidate funds by accumulating cleared payments, and then sweeping the accumulated funds into a default commercial account at the end of the period. The funds may be swept into the commercial account on a periodic basis, such as a daily basis, or once the accumulated funds reach a certain threshold value or the number of payments reaches a threshold number.

Business-to-business payments, for example, payment by a business customer to a supplier, may also be effected using this system. If the recipient business is also enrolled in the commercial registry, the CCF 100 will handle the payment using the funds consolidation method. To enable transactions between two or more payment systems, for example two domestic payment systems in a cross-border transaction, the financial institutions in each country are affiliated with a regional CCF 100 in that country. Customers in each country use their partner institution's authentication process to log into their selected delivery channel (Internet, telephone, ATM, wireless, etc.). Each regional CCF is responsible for storing, sending and receiving all payments which originate and terminate at that site. Only a limited amount of data is replicated between the regional sites when it is required to perform a function. Preferably, any replication is carried out based on an asynchronous remote XML request, which carries the data to be replicated. There is therefore no requirement for real time data synchronization between regional CCF sites.

Figure 21:
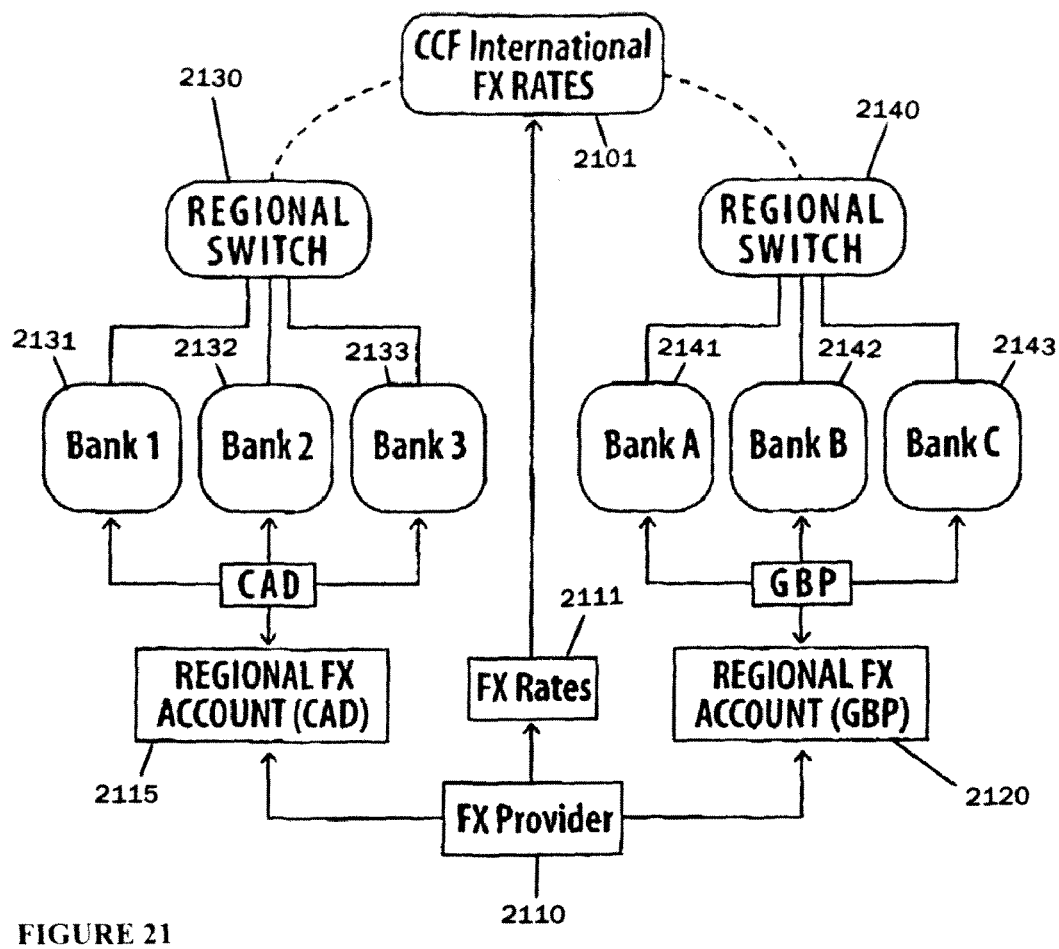
FIG. 21 is a block diagram illustrating a network for P2P payments between a payor and a payee in different jurisdictions according to the invention.

Referring to FIG. 21, an international CCF site 2101 is primarily responsible for coordinating the exchange of data between the regional CCF sites. The international CCF also maintains a global directory of affiliated institutions. A foreign exchange (FX) facility 2110 maintains a database of exchange rates 2111 and manages currency exchange transactions, and maintains trust accounts 2115, 2120 in each jurisdiction in the local currency.

For an international payment, the CCF switch 2130 at the point of origin of the payment queries the global directory to determine which institution 2141, 2142, 2143 and CCF regional switch 2140 has been designated by the recipient. If a currency exchange is required, the CCF switch at the point of origin also communicates with an FX facility to determine the exchange rate and book the currency exchange. The payment details are replicated by the regional CCF 2130 to the regional CCF 2140 of the recipient using an asynchronous messaging mechanism.

At the point of destination, the regional CCF 2140 delivers a payment notification to the intended recipient. The notification includes an encrypted payment reference number, which contains a payment identification code to identify the payment's point of origin. The notification directs the recipient to an affiliate institution to claim the payment. The recipient logs onto the selected banking service and receives the funds. Funds transfer occurs by means of transfers between suspense accounts and customer accounts, as described above.

Settlement between financial institutions takes place on a periodic basis, for example at the end of each business day. Based on agreed cut-off times, the CCF 2101 provides each member institution 2131, 2132, 2133, 2141, 2142, 2143 with reconciliation and settlement information. This data is used to reconcile transactions between the CCF 2101 and each institution, as well as to determine the institution's monetary obligations to other members in the network to effect settlement.

Where the institutions are located in different jurisdictions, settlement takes place between the originating and destination institutions using the exchange settlement facility's accounts in the jurisdiction of each institution 2115, 2120, based on settlement advice provided by the A9 CCF 2101. The international CCF site 2101 is networked to a number of regional CCF sites. The participating financial institutions (2131, 2132, 2133, 2141, 2142, 2143) in each region are connected to its corresponding regional switch 2130, 2140. Each of these institutions maintains a suspense account. The FX facility has an international site networked with local sites, which are in communication with each of the institutions in the same region. Each local FX site maintains a local currency settlement trust account 2115 2120 on behalf of the international CCF, through which all foreign exchange settlement will take place.

The networked CCFs provide settlement advice to the financial institutions so that the institutions may make aggregate transfers. These transfers are made to the local currency settlement trust accounts in the local currency, and not to the other institutions. Each transfer may be carried out by means of wire payment to provide finality of transfer. A10

Figure 14:
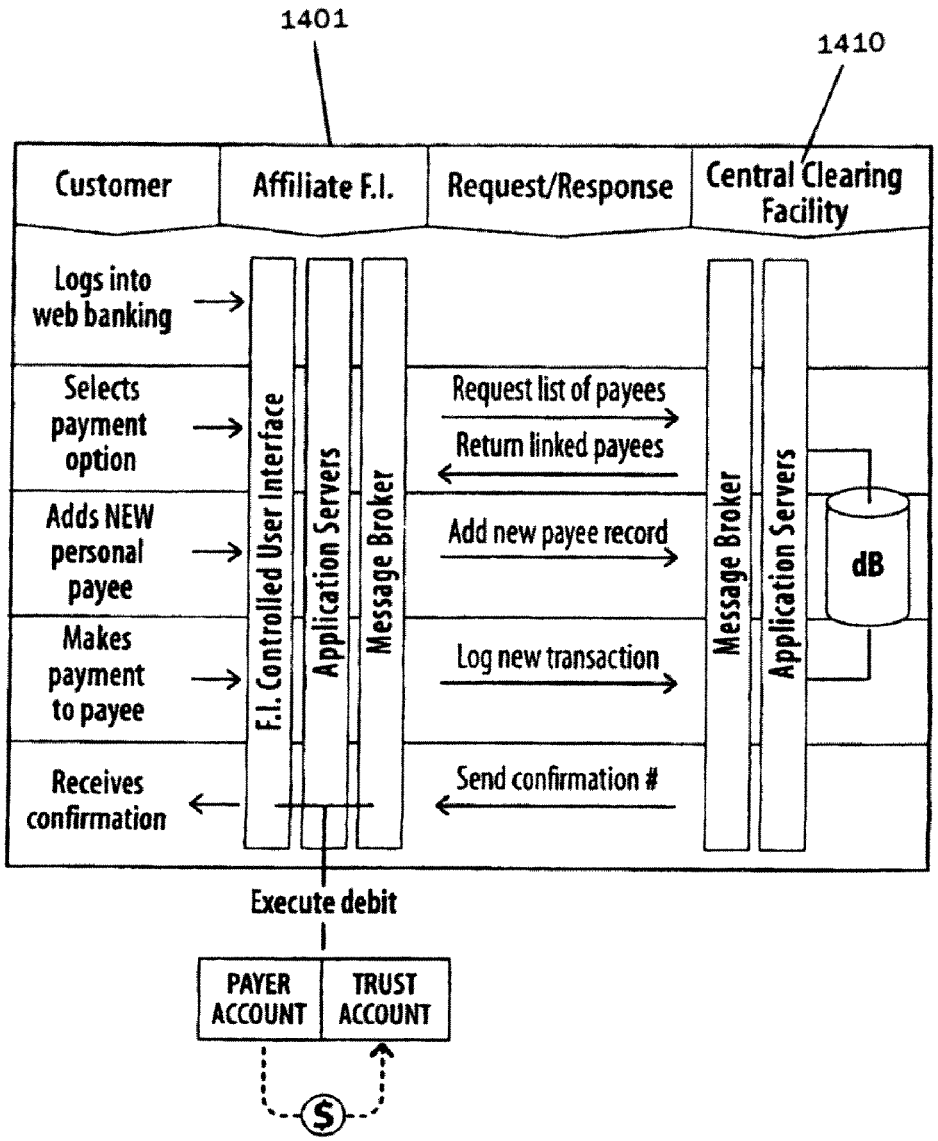
FIG. 14 is a table illustrating a request/response message set in the interaction between the CCF and a partner financial institution.

Access to functions beneath the user interface layer is provided utilizing a request/response XML-based message set. All communications are encrypted and signed. FIG. 14 illustrates high-level interaction between a partner institution's middleware 1401 and the CCF facility 1410 to reconcile a payment to a new payee. FIG. 15 shows a number of possible message sets 1501 and explains how they are used to facilitate P2P payments. Each message set consists of a request initiated by a partner institution's middleware and a response returned by the CCF 100. These messages invoke additional system processes at the CCF 100.

According to the invention, the use of specific delivery channels is left to the discretion of the partner institution. While the primary channel is online banking, the service can be extended to telephone banking and host-based ATMs.

Currently, consumers access Web banking services almost exclusively on a browser residing on a personal computer. As Internet-enabled appliances gain mass acceptance and continue to improve in terms of cost, connectivity, display, memory and processing capabilities, financial institutions will offer banking services through these devices. A single interface is required between the institution and the CCF 100 to support multiple Web-enabled devices. Java-based adapters allow institutions to communicate internally with other application servers that support specific devices.

Once financial institutions have implemented P2P payment capabilities on their Web banking service, they can utilize the message-based interface of the invention to support a synchronized, multi-channel delivery strategy to offer users of non-PC devices access to the same list of personal payees from their Web channel. Due to current data-entry interface limitations in mobile devices (such as WAP-enabled cell phones, ATMs and telephone banking VRUs), it may be more practical to display a customer's pre-existing list of personal payees through these channels. The identity management system of the invention has the capability to store lists of customers' established payment linkages from prior payment requests.

For example, a consumer wants to re-credit an acquaintance for picking up the dinner tab at a restaurant. This payee could log onto their institution's wireless banking service, select the payment recipient from his or her list of past personal payees and enter a monetary amount and a specific account from which to draw the funds. Upon receipt of the payment request, the CCF 100 immediately launches a payment notification and the recipient can authenticate to deposit the funds the next time he or she accesses email. Mobile P2P payments will help institutions extend their wireless banking platforms, increase adoption and leverage their investments in that channel.

Most banks currently offer some form of telephone banking service through an automated voice response unit (VRU). Typically, customers that authenticate with a PIN number can select and pay merchants from a previously determined personal list. A list of pre-existing personal payees stored by the CCF is akin to the merchant list concept in the previous example and can be presented on the VRU platform through the CCF's XML messaging interface.

Similarly to Web and telephone banking delivery, the institution can display a customer's existing list of personal payees on ATMs for convenient re-use by leveraging the messaging interface and identity management system of the invention.

A Web-based publishing tool is supplied with the administration suite enabling marketing managers at institutions to control the email banners that appear on these notifications. The CCF can send notifications to employees within partner institutions. Notification functionality is determined by the institution through the CCF's Web-based administration and reporting tools.

The invention provides a secure Web-based interface for staff at partner institutions to manage customer service, business planning, marketing and key system and security parameters. Different job categories allow bank staff varying levels of access to information and functions of the invention.

The financial institution's system security administrator possesses root-level access that grants privileges to other staff. This administrator can define and update certain system-wide security parameters that govern transactions originating from the institution's Web banking service. These parameters include maximum transaction limits, daily transaction limits per consumer and the maximum number of days before an unretrieved payment is sent back to the payer for re-crediting.

An institution's Web service channel manager can publish and update marketing messages that appear on CCF-triggered email payment notifications. As well, the channel manager can view all multilingual email templates delivered to customers to facilitate payments and direct customers to URLs that open online banking services or logon to existing accounts. This person can also view all system-generated business metric reports that yield rich statistics, such as payment volumes, customer activation levels, methods consumers use to catch payments, average payment amounts and the average time between payment initiation and final settlement.

Customer service representatives (CSRs) can make inquiries using transaction confirmation codes that facilitate payment tracing. The invention provides a complete audit trail for any activity related to a particular customer or payment transaction within a certain time period. CSRs can provide support by viewing payment-processing information. Detailed lists of system-generated messages (and explanations) as well as daily schedules for processing are some of the items that CSRs can access in responding to customer inquiries. The system also features CCF bulletin boards to publish messages that could impact upon customers' immediate use of the service.

Figure 16:
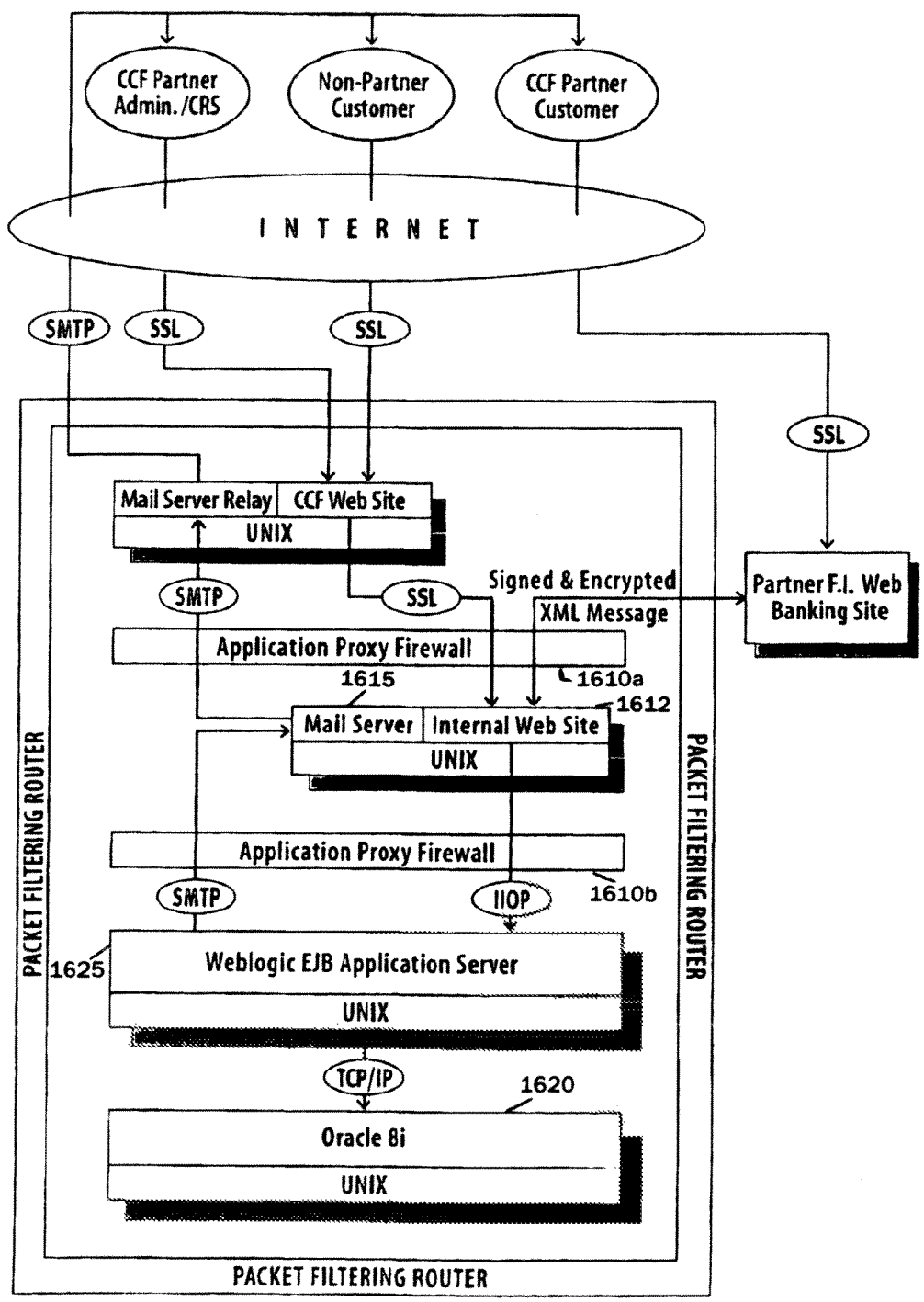
FIG. 16 is a block diagram illustrating a preferred security system for the CCF.

The architecture of the invention, illustrated in FIG. 16, provides performance, security, availability and scalability. The invention delivers protection from unauthorized external or internal access by implementing several industry standard mechanisms including: multi-layer firewall structure 1610*a*, 1610*b*; secure access lockdown of Web servers 1612 and mail servers 1615; extensive intrusion detection; documentation security and escalation procedures. The invention supports a cluster server architecture designed to provide maximum fault tolerance, performance and scalability.

The invention uses XML based request/response messaging to exchange information with financial institutions. Each XML message consists of a standard header and variable body sections. The system is designed to support versioning and to be backwards compatible as new features are added or new means of access to online banking are provided to customers. For example, where an institution requests a payment transaction on behalf of its client the financial institution's own Internet banking application presents the appropriate form to the customer, gathers and validates the data entered by the customer and formats the XML request such as:

```
<?xml version = "1.0" encoding="utf-8"?>
<!DOCTYPE REQPMTBGRQ SYSTEM "file://reqpmtbgrq.dtd">
<CCFREQUEST>
    <MESSAGEHDR>
        <MESSAGETYPE>8</MESSAGEGETTYPE>
        <MESSAGETYPEVER>1.1</MESSAGETYPEVER>
        <FIID>10</FIID>
        <TRANTOKEN>X35JCBE</TRANTOKEN>
    </MESSAGEHDR>
    <MESSAGEBODY>
        <FIUSERID>56450983045034</FIUSERID>
        <CUSTOMERID>B7856434U4</CUSTOMERID>
        <CURRENCY>CAD</CURRENCY>
        <PMTAMOUNT>65.00</PMTAMOUNT>
        <EXPIRYDATE>2000-09-16-23:59:00.000000
        </EXPIRYDATE>
        <MEMO>Here is the money I owe you for dinner. Thanks
        </MEMO>
    </MESSAGEBODY>
</CCFREQUEST>
```

The invention executes the appropriate transaction and return a response to the Financial Institution using a similar format.

The preferred production system runs on a hardware platform under the Unix Operating System and uses commercially available and reliable Application and Database Management Software 1625, 1620. The system is housed in data center facility. The preferred embodiment of the invention employs Java 2 Enterprise Edition technology coupled with an enterprise relational database system using a clustered, fault-tolerant configuration which is both scalable and extensible, providing the ability to easily manage and update with additional features and services as required.

Figure 17:
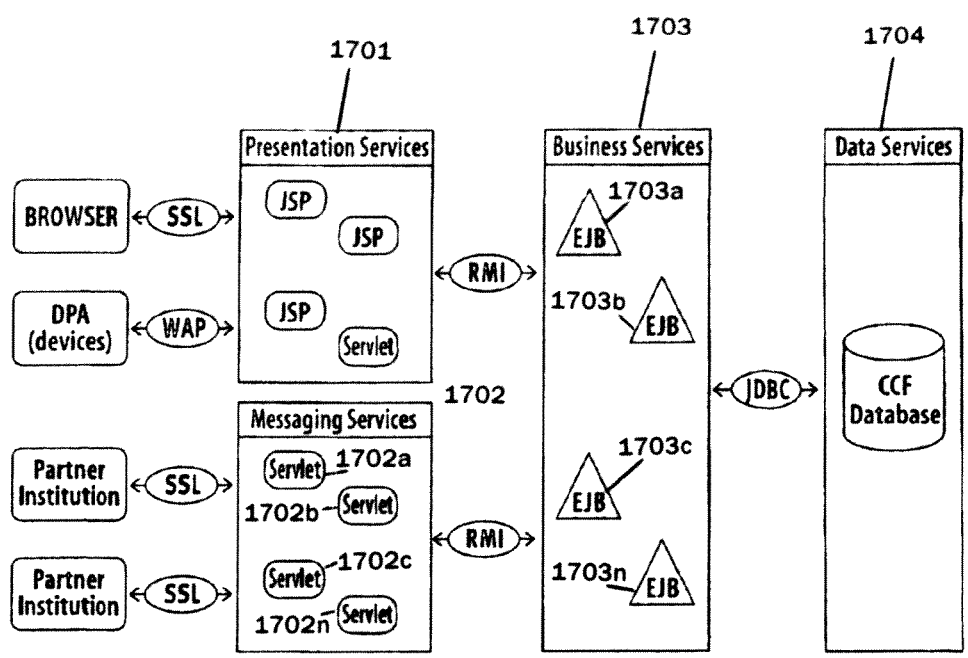
FIG. 17 is a block diagram illustrating the relationship between logical service items in the system of the invention.

Applying multi-tier distributed design patterns, the invention is composed of four logical service items (presentation 1701, messaging 1702, business 1703 and data 1704), shown in FIG. 17, that are physically distributed through several redundant, fault-tolerant and balanced implementation systems. Presentation logic is the link between the client interface and the business logic. Using JavaBean and Servlet specifications, the presentation logic components communicate with the business logic components (EJBs) 1703*a*, 1703*b*, 1703*c*. 1703*n*. The presentation logic 1701 is based on the concept of heterogeneous client interfaces, allowing both browser and non-browser interfaces to communicate with the CCF 100. The messaging layer 1702 is the link between the partner institution and the business logic. This layer consists of a number of Java servlets1702*a*, 1702*b*, 1702*c*. 1702*n* responsible for parsing and validating XML messages and the invocation of appropriate business components. Business logic is processed by a distributed middleware server with enabled clustering and object caching based on the Enterprise JavaBean standard. Both business logic and functional rules are maintained in a series of session beans and entity beans that are located on networked systems. Enterprise JavaBeans (EJBs) communicate with the associated data media and apply any relevant business rules. Data media and its associated transactions are maintained in an enterprise database system supporting both the encryption of resident data and the features that promote redundancy and reliability.

The following technologies may be employed in the implementation of the system and method of the invention:

Java 2 Standard Edition

Java™ 2Standard Edition (J2SE™) is a Web platform that enables rapid development and deployment of software applications across multiple operating systems and platforms with fewer defects than similar technologies. With significant performance gains and improved Web deployment mechanisms for enterprise, client-side Java applets and applications, J2SE Version 1.3 includes a new client Java virtual machine (JVM™), tuned libraries throughout the platform and enhancements to the Java Plug-in software for improved Web browser delivery.

Java Beans

Developed in collaboration with industry leaders, JavaBeans are a portable, platform-independent component model written in Java JavaBeans enable developers to write reusable components once and run them anywhere independent of platform.

Java 2 Enterprise Edition

The Java™ 2 Platform, Enterprise Edition (J2EE), defines the standard for developing multi-tier enterprise applications. J2EE simplifies enterprise applications by basing them on standardized, modular components, providing a complete set of services to those components and handling many application behavior details without complex programming. J2EE takes advantage of many Java 2 Platform, Standard Edition, such as "Write Once, Run Anywhere™" portability, JDBC™ API for database access, CORBA technology for interaction with existing enterprise resources and a security model that protects data even in Internet applications. Building on this base, Java 2, Enterprise Edition, adds full support for Enterprise JavaBeans™ components, Java Servlets API, JavaServer Pages™ and XML technology.

Java Server Pages

The JavaServer Pages™ technology provides a quick and simple way to create dynamic Web content while enabling rapid development of Web-based applications that are server- and platform-independent. The Java™ Servlet API provides Web application developers with a simple and consistent mechanism for extending Web server functionality.

Enterprise Java Beans

The Enterprise JavaBeans specification defines an API that helps developers create, deploy and manage cross-platform, component-based enterprise applications that work with systems currently in use.

Java Naming and Directory Interface

This provides uniform, industry-standard and seamless connectivity between the Java platform and one's business information assets, allowing developers to deliver Java applications with unified access to multiple naming and directory services across the enterprise.

Java Database Connectivity

This provides programmers with a uniform interface to a wide range of relational databases, as well as a common base upon which higher-level tools and interfaces can be built.

Java Messaging Services

This specification provides developers with a standard Java API for enterprise messaging services, such as reliable queuing, publishing and subscription communication and various aspects of push/pull technologies.

Remote Method Invocation Over IIOP

RMI-IIOP provides developers an implementation of the Java RMI API over the Object Management Group's industry-standard Internet Inter-Orb Protocol (IIOP). It allows developers to write remote interfaces between clients and servers and implement them using Java technology and the Java RMI APIs.

XML

XML (eXtensible Markup Language) is a simplified subset of the Standard Generalized Markup Language (SGML, ISO 8879) that provides a file format for representing data, a schema for describing data structure and a mechanism for extending and annotating HTML with semantic information.

Secure Socket Layer API

Secure Sockets Layer (SSL) is the Internet security protocol for point-to-point connections. It provides protection against eavesdropping, tampering and forgery. Clients and servers establish a secure link, or "pipe," across the Internet to protect information that is sent and received to ensure confidential, authentic and original information exchange.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A payment transfer system, comprising:
   an application server, comprising:
      at least one processor;
      memory operatively coupled to the at least one processor; and
      a computer-executable module stored in the memory which, when executed by the at least one processor, causes the application server to receive, over a network from a first financial institution system associated with a payer account, first payment data relating to a transfer of funds from a payer associated with the payer account to a payee, and to store in the memory the first payment data in association with a reference value, the first payment data comprising a payment amount, payee identification data, and authentication data for authenticating the payee,
      wherein prior to the application server receiving the first payment data, the payer is authenticated by the first financial institution system, and the first payment data and an identification of the payer account is received by the first financial institution system from the authenticated payer, and further wherein the first financial institution system debits an amount of funds associated with the transfer of funds from the payer account and credits a trust account associated with the first financial institution with the amount of funds; and
   a notification server in communication with the application server, the notification server comprising:
      at least one second processor;
      second memory operatively coupled to the at least one second processor; and
      a computer-executable module stored in the memory which, when executed by the at least one second processor, causes the notification server to transmit a notification of the transfer of funds to the payee identified using received payee identification data, wherein the notification comprises the reference value;

wherein the application server computer-executable module, when executed, further causes the application server to:

receive, over a network from a second financial institution system associated with the payee, second payment data comprising the reference value, wherein prior to the application server receiving the second payment data, the payee is authenticated by the second financial institution system and the second financial institution system receives an identification of a payee account associated with the payee and the second financial institution from the authenticated payee, and the second financial institution system receives the reference value;

receive, from the second financial institution system, authentication information, wherein the authentication information is received by the second financial institution system from the authenticated payee;

verify the received authentication information using the stored authentication data, and if the received authentication information is verified, provide verification of the transfer of funds to the second financial institution system such that the second financial institution system, after receipt of the verification of the transfer of funds, credits the payee account with the payment amount, and debits a trust account associated with the second financial institution with the amount of funds; and maintain reconciliation information relating to the transfer of funds for provision to the first and the second financial institution systems for reconciling their associated trust accounts.

2. The payment transfer system of claim 1, further comprising:

a first online service associated with the first financial institution for use by the payer, such that the first financial institution system authenticates the payer using the first online service, the first online service being configured to receive from the authenticated payer and provide to the first financial institution system a request for a transfer of funds comprising the first payment data and the identification of the payer account such that the first financial institution system can confirm that the identified payer account comprises sufficient funds for debiting the amount of funds prior to transmitting the first payment data to the application server; and a second online service associated with the second financial institution for use by the payee, such that the second financial institution system authenticates the payee using the second online service, the second online service being configured to receive and provide to the second financial institution system the reference value, the authentication information, and the identification of the payee account.

3. The payment transfer system of claim 1, wherein the authentication data comprises at least one challenge-response question and at least one corresponding answer, and the authentication information received from the second financial institution system comprises data for verification against the at least one corresponding answer.

4. The payment transfer system of claim 1, wherein the network is the Internet.

5. The payment transfer system of claim 1, wherein the payment amount is specified in a first currency, and the funds debited from the payer account are debited in the first currency, and the payment amount is credited to the payee account in a second currency.

6. The payment transfer system of claim 1, wherein the first financial institution and the second financial institution are the same, and the first online service and the second online service are the same.

7. An authentication method for use in association with a transfer of funds, comprising:

receiving, at an application server from a first financial institution system, first payment data relating to a transfer of funds from a payer associated with the payer account to a payee, the first payment data comprising a payment amount, payee identification data, and authentication data for authenticating the payee, wherein the first payment data is received by the first financial institution system from the payer after authentication of the payer by the first financial institution system;

storing the first payment data in memory at the application server in association with a reference value;

transmitting a notification of the transfer of funds to the payee identified using the payee identification data, the notification comprising the reference value;

receiving, at the application server from a second financial institution system associated with the payee, second payment data comprising the reference value, wherein the second payment data is received by the second financial institution system from the payee after authentication of the payee by the second financial institution system;

determining, at the application server, whether the payee identification data is authenticated and stored in association with the payer and the second financial institution;

if the payee identification data is not authenticated and stored in association with the payer and second financial institution:

receiving, at the application server, authentication information from the second financial institution system, wherein the authentication information is received by the second financial institution system from the authenticated payee; and verifying, by the application server, the received authentication information using the stored authentication data, and if the received authentication information is verified, authenticating and storing the payee identification data in association with the payee and the second financial institution; and if the payee identification data is authenticated and stored in association with the payer and second financial institution, providing verification of the transfer of funds to the second financial institution system.

8. The authentication method of claim 7, wherein the authentication data comprises at least one challenge-response question and at least one corresponding answer, and the authentication information received from the second financial institution system comprises data for verification against the at least one corresponding answer.

9. A method for transferring funds from an account associated with a payer to an account associated with a payee, the method comprising:

receiving, at a central server, from a first financial institution system associated with the payer account, first payment data relating to a transfer of funds, the first payment data comprising a payment amount, payee identification data, and authentication data for authenticating the payee, wherein the first payment data is received by the first financial institution system from the payer after authentication of the payer by the first financial institution system and the first financial institution system debits funds associated with the transfer of funds from the payer account;

storing, in memory at the central server, the first payment data in association with a reference value;

transmitting a notification of the transfer of funds to the payee identified using the payee identification data, the notification comprising the reference value;

receiving, at the central server, from a second financial institution system associated with the payee, second payment data comprising the reference value, wherein the second payment data is received by the second financial institution system from the payee and the second financial institution system authenticates the payee;

determining, by the central server, whether the payee identification data is authenticated and stored at the central system in association with the payer and the second financial institution;

if the payee identification data is not authenticated and stored in association with the payer and second financial institution:

receiving, at the central server, authentication information from the second financial institution system, wherein the authentication information is received by the second financial institution system from the authenticated payee; and verifying, by the central server, the received authentication information using the stored authentication data, and if the received authentication information is verified, authenticating and storing at the central server the payee identification data in association with the payee and the second financial institution; and if the payee identification data is authenticated and stored in association with the payer and second financial institution, transmitting, from the central server, verification of the transfer of funds from the central system to the second financial institution system, wherein the second financial institution system credits the payment amount to an account associated with the payee after receipt of verification of the transfer of funds.

10. The method of claim 9, further comprising:

authenticating, by the first financial institution system, the payer;

receiving, by the first financial institution system from the authenticated payer, a request for a transfer of funds comprising the first payment data and comprising an identification of the payer account from which funds are to be debited;

transmitting, by the first financial institution system, the first payment data to the central system;

debiting the funds from the identified payer account after the central server receives the first payment data.

11. The method of claim 10, further comprising, at the first financial institution system, confirming that the identified payer account comprises sufficient funds for debiting before the step of transmitting the first payment data to the central server.

12. The method of claim 10, wherein the payment amount is provided in a first currency and the step of debiting the funds from the identified payer account is carried out in the first currency, and further wherein account associated with the payee is credited in a different currency.

13. The method of claim 9, wherein the reference value is received by the second financial institution system further comprising transmitting provide a notification of the transfer of funds to the payee.

14. The method of claim 10, further comprising, before receiving from a second financial institution the second payment data:

authenticating, by the second financial institution system, the payee;

transmitting, from the second financial institution system to the central server, the second payment data; and after providing the second financial institution with verification of the transfer of funds:

crediting, by the second financial institution system, the account associated with the payee after receipt of the verification of the transfer of funds.

15. The method of claim 14, further comprising, prior to crediting the payee account, receiving from the payee an identification of the payee account prior to crediting the account.

16. The method of claim 9, further characterized in that the first financial institution system debits funds associated with the transfer of funds by crediting a first trust account at the first financial institution with the amount of funds debited from the payer account when the first financial institution debits the payer account; and the second financial institution system credits the payment amount to the account associated with the payee by debiting a second trust account at the second financial institution by the payment amount when the second financial institution credits the payee account, and wherein the method further comprises maintaining, at the central server, reconciliation information relating to the transfer of funds, and providing the reconciliation information the first and the second financial institution systems for reconciling the first and second trust accounts.

17. The method of claim 9, wherein the authentication data comprises at least one challenge-response question and at least one corresponding answer, and the authentication information received from the second financial institution system comprises data for verification by the central server against the at least one corresponding answer.

18. The method of claim 9 wherein the payment amount is specified in a first currency, and the funds debited from the payer account are debited in the first currency, and the payment amount is credited to the payee account in a different currency.

19. The method of claim 9 wherein the first financial institution and the second financial institution are the same.

20. The method of claim 9 wherein the steps of receiving the first payment data, transmitting the notification of the transfer of funds, receiving the second payment data, and transmitting the verification of the transfer of funds are carried out over the Internet.

* * * * *